(12) United States Patent
Way et al.

(10) Patent No.: US 9,581,765 B2
(45) Date of Patent: Feb. 28, 2017

(54) SCALABLE OPTICAL SWITCHES AND SWITCHING MODULES

(71) Applicant: NeoPhotonics Corporation, San Jose, CA (US)

(72) Inventors: Winston Way, Irvine, CA (US); Anthony J. Ticknor, Cupertino, CA (US); Ilya Vorobeichik, Los Gatos, CA (US)

(73) Assignee: NeoPhotonics Corporation, San Jose, CA (US)

( * ) Notice: Subject to any disclaimer, the term of this patent is extended or adjusted under 35 U.S.C. 154(b) by 96 days.

(21) Appl. No.: 14/518,290

(22) Filed: Oct. 20, 2014

(65) Prior Publication Data

US 2015/0036971 A1 Feb. 5, 2015

Related U.S. Application Data

(63) Continuation of application No. 13/662,452, filed on Oct. 27, 2012, now Pat. No. 8,891,914.
(Continued)

(51) Int. Cl.
| | |
|---|---|
| *G02B 6/35* | (2006.01) |
| *H04Q 11/00* | (2006.01) |
| *G02B 6/122* | (2006.01) |
| *H04J 14/02* | (2006.01) |
| *G02B 6/12* | (2006.01) |

(52) U.S. Cl.
CPC ......... *G02B 6/3546* (2013.01); *G02B 6/1225* (2013.01); *G02B 6/35* (2013.01); *G02B 6/356* (2013.01); *G02B 6/3562* (2013.01); *H04Q 11/0005* (2013.01); *G02B 2006/12145* (2013.01); *H04J 14/0212* (2013.01); *H04J 14/0219* (2013.01); *H04Q 2011/0024* (2013.01); *H04Q 2011/0052* (2013.01)

(58) Field of Classification Search
None
See application file for complete search history.

(56) References Cited

U.S. PATENT DOCUMENTS

| | | | |
|---|---|---|---|
| 5,408,548 | A | 4/1995 | Olmstead |
| 5,581,643 | A | 12/1996 | Wu |

(Continued)

FOREIGN PATENT DOCUMENTS

| | | |
|---|---|---|
| CN | 2550781 Y | 5/2003 |
| CN | 102138138 A | 7/2011 |

(Continued)

OTHER PUBLICATIONS

European search report for European application No. 12843541.9 dated Jul. 17, 2015 (6 pages).

(Continued)

*Primary Examiner* — Hemang Sanghavi
(74) *Attorney, Agent, or Firm* — Christensen, Fonder & Dardi; Peter S. Dardi

(57) ABSTRACT

Telecommunications switches are presented, including expandable optical switches that allow for a switch of N inputs×M outputs to be expanded arbitrarily to a new number of N inputs and/or a new number of M outputs. Switches having internal switch blocks controlling signal bypass lines are also provided, with these switches being useful for the expandable switches.

7 Claims, 34 Drawing Sheets

Related U.S. Application Data

(60) Provisional application No. 61/552,616, filed on Oct. 28, 2011, provisional application No. 61/594,539, filed on Feb. 3, 2012, provisional application No. 61/642,280, filed on May 3, 2012.

(56) References Cited

U.S. PATENT DOCUMENTS

| | | | |
|---|---|---|---|
| 6,144,781 | A | 11/2000 | Goldstein et al. |
| 6,615,615 | B2 | 9/2003 | Zhong et al. |
| 6,658,179 | B2 | 12/2003 | Kubby et al. |
| 6,674,935 | B2 | 1/2004 | Kelly et al. |
| 6,711,313 | B2 | 3/2004 | Takigushi et al. |
| 6,868,201 | B1 | 3/2005 | Johnson et al. |
| 6,882,800 | B1 | 4/2005 | Graves |
| 6,990,265 | B2 | 1/2006 | Kubby et al. |
| 6,999,652 | B2 | 2/2006 | Mino et al. |
| 7,085,445 | B2 | 8/2006 | Koh et al. |
| 7,160,746 | B2 | 1/2007 | Zhong et al. |
| 7,206,473 | B2 | 4/2007 | Mino et al. |
| 7,447,397 | B1 | 11/2008 | Maki et al. |
| 7,590,312 | B2 | 9/2009 | Mizuno et al. |
| 7,805,037 | B1 | 9/2010 | Van Der Vliet et al. |
| 2002/0030867 | A1 | 3/2002 | Iannone et al. |
| 2002/0163693 | A1 | 11/2002 | Rubissa et al. |
| 2002/0191899 | A1 | 12/2002 | Kelly et al. |
| 2003/0210870 | A1 | 11/2003 | Graves |
| 2004/0264960 | A1 | 12/2004 | Maciocco et al. |
| 2006/0165070 | A1 | 7/2006 | Hall et al. |
| 2006/0263088 | A1 | 11/2006 | Handelman |
| 2007/0154137 | A1 | 7/2007 | Mino et al. |
| 2008/0226290 | A1 | 9/2008 | Ohyama et al. |
| 2009/0067845 | A1 | 3/2009 | Zhong et al. |
| 2010/0014863 | A1 | 1/2010 | Zami et al. |
| 2011/0200335 | A1 | 8/2011 | Koka et al. |
| 2013/0058607 | A1 | 3/2013 | Binkert et al. |
| 2015/0244647 | A1* | 8/2015 | Gopalan ............... H04L 49/201 370/386 |

FOREIGN PATENT DOCUMENTS

| | | |
|---|---|---|
| JP | S62-034497 A | 8/1985 |
| JP | 2003-018625 A | 6/2001 |
| JP | 2002516406 A | 6/2002 |
| JP | 2011-526753 A | 10/2011 |
| TW | 200503463 A | 1/2005 |
| TW | 201213909 A | 1/2012 |
| WO | 99-60434 A1 | 11/1999 |

OTHER PUBLICATIONS

Taiwan Office Action for Patent Application No. 101140040 dated Jul. 11, 2016.

Appelman et al., (Nov. 1, 2001) "All-Optical Switches—The Evolution of Optical Functionality," in LightwaveOnline, vol. 18, Iss. 13, retrieved May 3, 2013 from http://www.civcom.com/admin/articles/spic/evolution.pdf (9 pages).

Goh et al., "High Extinction Ratio and Low Loss Silica-Based 8×8 Strictly Nonblocking Thermooptical Matrix Switch," J. of Lightwave Technology, 17(7):1192-1199, Jul. 1999.

Goh et al., "Low Loss and High Extinction Ratio Strictly Non-Blocking 16×16 Thermooptical Matrix Switch on a 6-in Wafer Using Silica-Based Planar Lightwave Circuit Technology," J. of Lightwave Technology, 19(3):371-379, Mar. 2001.

Prasanna et al., "Versatility of a Colorless and Directionless WSS Based ROADM Architecture," COMSNET 2009 Conference, Jan. 2009, Bangalore, India.

Watanabe et al., "Compact PLC-based Transponder Aggregator for Colorless and Directionless ROADM," OFC/NFOEC 2011, paper OTuD3 (abstract only), Mar. 2011.

International Search Report and Written Opinion for co-pending PCT Application No. PCT/US2012/062329 dated Mar. 15, 2013 (10 pages).

Japanese Office Action for Patent Application No. 2014-539098 dated Jun. 6, 2016 (9 pages—translation).

Chinese Office Action for Patent Application No. 201280061235 dated Apr. 20, 2016 (5 pages—translation).

* cited by examiner

Received optical power at a CR versus Nsplit=Nwss,max

Relative total ROADM cost using different MCS types and drop ratio.

SCALABLE OPTICAL SWITCHES AND SWITCHING MODULES

CROSS REFERENCE TO RELATED APPLICATIONS

This application is a continuation of copending U.S. patent application Ser. No. 13/662,452 filed on Oct. 27, 2012 to Ticknor et al., entitled "Scalable Optical Switches and Switching Modules," which claims priority to U.S. provisional applications 61/552,616 filed on Oct. 28, 2011 to Vorobeichik et al., entitled "Scalable Optical Switches and Switching Modules," 61/594,539 filed on Feb. 3, 2012 to Way et al., entitled "Scalable Optical Switches and Switching Modules," and 61/642,280 filed on May 3, 2102 to Way et al., entitled "Scalable Optical Switches and Switching Modules," all four of which are incorporated herein by reference.

TECHNICAL FIELD OF THE INVENTION

The technical field of the invention relates to a scalable system of optical switches based on optical switch devices that are constructed in modular form for expansion of the switch system to achieve desired switching capability for an optical communication system. The invention further relates to optical networks incorporating expandable modular optical switching capability.

BACKGROUND OF THE INVENTION

Modern optical communications networks are universally used to interconnect distant, regional, and metropolitan communications hubs for directing numerous diverse streams of telephony, digital video, internet, and other types of digital data. The means for most efficiently and economically managing the ever-increasing capacity and speed demands on these networks, many communications channels are aggregated into streams each carrying up to 10 gigabits per second, presently emerging 40 and 100 gigabits per second, and future prospects for multiple hundreds of gigabits per second per aggregated data stream. Dozens of these data streams are transmitted simultaneously through each fiber in the network utilizing wavelength-division multiplexing (WDM) where each stream is carried by an optical signal having an optical wavelength slightly different but fully distinguishable from all the other wavelengths for the other streams in the fiber. These optical streams are routinely combined and separated as appropriate by various well-known optical filter components at each end of the optical fiber link.

These optical networks include many locations where optical fibers intersect at 'nodes'. These nodes are in many ways analogous to the intersections of a complex highway system. Much traffic comes to the node along each of the fibers, but not all the traffic on any fiber is necessarily bound for the same destination. Some of the traffic may be bound for destinations local to the node, there may be new traffic originating local to the node, and other traffic may need to be independently rerouted among the various outbound fibers from the node. Effecting the necessary reconfiguration of traffic at these nodes is provided by switches.

Until recently, the primary means to provide such switching would be electronic. To accomplish this, every wavelength in each fiber would be separated to individual physical channels, and then the data in each of those wavelengths would be converted by an optical receiver into binary electrical data. Once all the data is in electrical form it can be piped into an electronic switching matrix in any of numerous possible configurations, and reorganized into appropriate groupings on multiple output channels. Then the data in each output channel is converted back to optical by an optical transmitter at each output having a specific predetermined wavelength and the data streams on distinct wavelengths bound for each output fiber are remultiplexed and inserted into that fiber. There may also be input and output data streams associated with local traffic that can be integrated with the data passing through the node using additional ports on the switching matrix. At the data rates used in each wavelength, electro-optic receivers and transmitters are relatively expensive, bulky, and power hungry as compared to purely optical dispatch. Also, within an electrical switch matrix, electrical power is required to push each and every bit of data through the matrix, and there may be hundreds of billions or trillions of bits moving through the matrix every second. In principle, electronic switching can provide the ultimate flexibility in reconfiguring, formatting, synchronizing, and otherwise optimizing the presentation of the data before sending it on its way. However, for the amount of data passing through a modern node, it is far and away simply impractical to switch everything electronically, and the economics of providing the fundamental hardware is also unsupportable. Furthermore, the bandwidth passing through the nodes is only expected to increase with time.

In the decade or so preceding this application, optical switching technology has been emerging to complement the electronic switching in concurrence with, and in fact enabling the increase in bandwidth of the data passing through the nodes. Optical switching generally treats each wavelength as a cohesive unit and passes each wavelength transparently to its destination within the node, either an output fiber or a wavelength channel associated with local traffic. The transparent optical switch effectively establishes a physical path for the light at the specified wavelength on the specified input fiber to be passed linearly and directly to the desired output fiber or local port. Such a switch essentially passes any optical data regardless of format or content as long as it is within the optical wavelength range specified for that optical channel. Since the optical switch cannot modify the detailed data within the optical wavelength, it is not as flexible as an electronic switch. But more significantly, the power required to switch the data for that wavelength is merely the amount of power needed to establish and maintain the optical path through the switch, which is generally orders of magnitude less than required for electronically switching the same data. As power consumption is often the limiting factor for the bandwidth that can be managed by a node, optical switching is not merely a convenience of remote configuration, but clearly enables the current and future performance levels of optical networks.

SUMMARY OF THE INVENTION

One well-accepted approach whereby electronic switching provides practical scalability is through modular expansion. A basic switching module is provided that supports the needs of a modest-sized switch. When a larger size switch is desired, instead of creating an additional component providing the new desired switch size, it is possible to interconnect multiple modules of the expandable switch and communication between the modules enables the set of modules to function as a larger switch. Prior to this invention, optical switching components were unable to provide a useful analogous capability. Optical switching components are generally cascadable by connecting the standard outputs of one component to the standard inputs of additional components. However this only provides for geometric expansion, i.e. 8 1×8 switches can be cascaded off of a single 1×8 switch to create a 1×64 switch. This geometric progression becomes too large too quickly to be of much use, and does not really provide what is needed for a modular, expandable switch. The object of the present invention is to provide a means to support linear expansion of integrated optical switching arrays and modules. The technical findings of these innovations reveal that a small fraction of additional optical circuit elements on the schematic periphery of the main optical circuitry for an optical switching component can provide expansion ports that allow multiple modules to be interconnected in linear configurations, and these expansion ports enable the needed communications between the optical switching components to make linear expansion practical. The principles of the innovations described herein can be applied to provide expansion capability to a variety of common optical switching architectures. Thus the innovations of the present invention enable scalable optical switching systems from linearly-expandable optical switching modules for any of the basic classes of optical switch architectures described herein. The applications of the invention to the architectures described herein are exemplary, and a person of ordinary skill in the art with the benefit of these teachings will be able to apply the invention to other configurations of optical switch architectures.

In a first aspect, the invention pertains to an optical switching device with expansion connections comprising a photonic integrated circuit. The photonic integrated circuit can comprise N input optical ports where N>1, an input light-path associated with each input port, M optical output ports where M≥1, an output light-path associated with each output port, a bypass optical switch block associated with each output port, P expansion-in ports where P≥1, an expansion light-path associated with each expansion-in port and connecting with an associated bypass switch block, a plurality of optical switching elements and associated light-paths forming a network of connections between the input light-paths and a by-pass switch block associated with an output light-path.

In a further aspect, the invention pertains to an optical switching device with expansion connections comprising a photonic integrated circuit. The photonic integrated circuit can comprise N input optical ports where N≥1, an input light path associated with each input port, M optical output ports where M>1, an output light path associated with each output port, a bypass optical switch block associated with each input port, Q expansion-out ports where Q≥1, an expansion light path associated with each expansion-out port and connecting with an associated bypass switch block, a plurality of optical switching elements and associated light paths forming a network of connections between the by-pass switch block associated with an input light path and the output ports.

In additional aspects, the invention pertains to an expandable optical switch device for dynamically configuring the interconnections between a selected number of optical input ports and M optical output ports. The switch device can comprise Z optical switching modules (Z≥2) with optical inter-connections to form a configuration having an initial module, a terminal module and optional intermediate modules, each optical switching module L comprising $N_L$ input ports and M output ports and desired switching capability between the input ports and output ports with the sum of $N_L$ equal to the selected number of input ports. Each optical switching module that is not an initial module can have a set of expansion in ports coupled through bypass switches to respective output ports, and each optical module that is not a terminal module can have a set of output ports coupled to expansion in ports of another module.

In other aspects, the invention pertains to an expandable optical switch device for dynamically configuring the interconnections between N optical input ports and a selected number of optical output ports, in which the switch device comprises Z optical switching modules (Z≥2) with optical inter-connections to form a configuration having an initial module, a terminal module and optional intermediate modules. Each optical switching module L can comprise N input ports and $M_L$ output ports and desired switching capability between the input ports and output ports with the sum of $M_L$ equal to the selected number of output ports. Each optical switching module that is not a terminal module can have a set of expansion out ports coupled through bypass switches to respective input ports, and each optical module that is not an initial module can have a set of input ports coupled to expansion out ports of another module.

Moreover, the invention pertains to an optical ring network comprising a plurality of nodes, two distinct optical rings connected to the nodes, and optical branches at each node providing an optical connection between each optical ring and to N output optical lines wherein the optical branches comprise two 1×N optical switches with each 1×N optical switch connected to a respective ring and N 2×1 bypass switches connecting the respective 1×N optical switches and the N optical lines.

Furthermore, the invention pertains to an optical network switching node comprising N optical light-paths, an N'×M' cross connect switch (OXC), and an N"×M" multicast switch (MCS), a set of bypass switches and a set of bypass light-paths between an OXC output and a bypass switch and wherein a bypass switch is also connected to an MCS output.

In further aspects, the invention pertains to an optical network switching node comprising N input light-paths, a drop bank and a contention mitigation structure, wherein the drop bank comprises a multicast switch (MCS) and the contention mitigation structure comprises a selective optical switch with the output from the selective optical switch directed through light channels to inputs of the MCS, wherein the N input light paths are divided into a subset providing input to the contention mitigation structure and a further subset providing input to the drop bank.

DETAILED DESCRIPTION OF THE INVENTION

Figure 1:
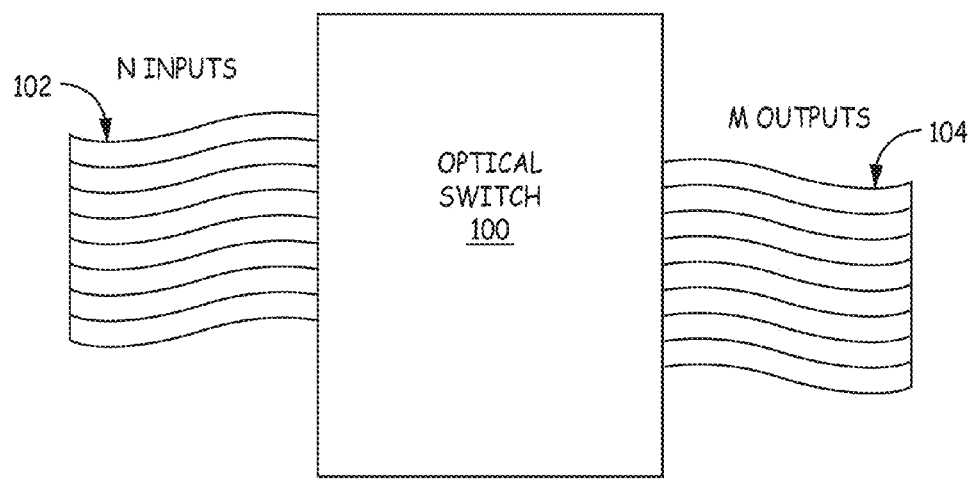
FIG. 1 depicts an optical switch having N inputs and M outputs.

Scalable optical switch modules provide for optical switching functions for optical networks, which can comprise large numbers of optical pathways. A switch module can comprise an array of actuatable 1:2 optical switch elements, 2:2 optical switches, splitters, and combiners, and can provide for connections to three sets of optical lines for integration capability in one dimension or connections to four sets of optical lines for integration capability in two dimensions. The two basic dimensions defining the switching function involve the input optical lines and the output optical lines. In some embodiments, an optical switching module can have bypass switches to provide for the bypass of a string of optical circuit elements to reduce corresponding optical loss from transmission through the switch elements if no switching function is performed for a particular input/output line within a module upon integration into an array of modules. With the availability of optical switch modules with reduced loss, a network architecture can be designed that can take greater advantage of the scalable optical switching function. Thus, based on the use of scalable optical switches, simpler scaling of optical network architectures may be achieved. Based on the ability to perform large scale optical switching using purely optical switches, the number of optical to electrical transducers within the network can be significantly reduced which results in a significant decrease in capital expenses as well as significant decrease in power consumption. The expandable switches can be conveniently constructed in the form of a planar light circuit, although the designs can also effectively be constructed from free space components, such as 1×2 or 2×2 switches connected with optical fibers. The expandable switches can be conveniently constructed in the form of a planar light circuit, although the designs can also effectively be constructed from free space components, such as 1×2 or 2×2 switches connected with optical fibers.

As with all communication networks, optical networks integrate switching functions to provide for various connections to provide for routing of transmissions. For example, longer range transmission pathways are connected with branches to direct optical signals between ultimate pathways associated with the sender and recipient. Separation of particular communications or portions thereof can be based on wavelength and/or temporal differentiation within a combined transmission sent over longer range trunk, i.e., combined signal, lines. At some location on a network, an optical band can be split to isolate specific signals within the band for routing, and similarly individual communications are combined for transmission over combined signal lines. The optical switching function can be performed using electronic switching by first converting the optical signal into an electronic signal with appropriate receiver(s). However, cost ultimately can be significantly reduced, and/or switching capacity significantly increased, if an efficient optical switching can be performed with reduced conversion of optical signals into electronic signals. The optical switching modules described herein provide desirable scalability through providing optical connections along multiple dimensions of a planar optical circuit along with an array of optical circuit elements.

If the optical switching cannot be appropriately scaled, optical switching can only be used in limited network architectures. Thus, a mesh optical network has been described to provide switching functionality based on 4-degree switching nodes. See, Prasanna et al., "Versatility of a Colorless and Directionless WSS Based ROADM Architecture," COMSNET 2009 Conference, January 2009, Bangalore, India, incorporated herein by reference. Planar optical circuits have been designed to accommodate 16×16 optical matrix switching on a single wafer. See, Goh et al., "Low Loss and High Extinction Ratio Strictly Non-Blocking 16×16 Thermooptical Matrix Switch on a 6-in Wafer Using Silica-Based Planar Lightwave Circuit Technology," J. of Lightwave Technology, 19(3), pp 371-379 (March 2001), incorporated herein by reference. However, the design of the 16×16 optical switches described by Goh et al. does not provide any straightforward scaling. Optical switching circuits described herein provide a high degree of scalability through the introduction of an additional layer of connectivity within the circuit, in which each individual optical circuit provides an n×m array of switches. The n×m array can be associated with n input optical ports and m output optical ports. The switching function can be referenced to N input lines and M output lines to provide for desired switching within the network, and the N×M switching function can be accomplished through the appropriate integration of the n×m switching function of the individual modules.

Optical and electronic switching complement each other in a switching node. Though improvements are still coming, the basic character of electronic switching is well established. The technology for optical switching however is still emerging and various innovations are still needed for optical switching devices to begin to fully address their expected domain. Present and forthcoming optical switching systems generally fall into a few basic architecture classes. Though there are not firm, universally accepted boundaries between these classes, generally they are thus: basic reconfigurable optical add-drop multiplexer (ROADM); wavelength-selective switch (WSS); optical cross-connect (OXC, or less commonly OCX); simple branching (1×N, N×1); and multicast switch (MCS). The fundamental operating characteristics for each of these classes are well established.

In summary, a basic ROADM provides the capability to independently determine for each wavelength in an input fiber whether that wavelength will be routed to the corresponding output fiber or dropped to a local port or different fiber pair. Additionally in a basic ROADM, any wavelength that is dropped and thus not directly routed to the output can be used to introduce new optical data streams from the local ports or other fiber pair into the output fiber. It is an unfortunate circumstance of optical networking arts that there are two very different items that bear the designation 'ROADM'. The ROADM component is as described in the preceding, but there are also higher-degree ROADM systems that can be used to selectively drop or route through individual wavelengths among a larger number of input/output fiber pairs. Originally ROADM systems were simply collections of ROADM components and the control systems that tied them together and the common name presented no problem. These higher-order ROADMs have, however, evolved and often comprise some of the other classes of optical switches including, for example, WSS, OXC and MCS. Legacy ROADM components still exist, but the ROADM term more commonly now refers to the higher-order system. Subsequently the term ROADM, unless specifically citing 'ROADM component', shall refer to the higher-level ROADM system. Specific embodiments are presented below of expandable OXC and MCS along with ROADM incorporating expandable MCS.

Current WSS class switches have a single input and several outputs and each wavelength on the input can be independently routed to any of the outputs and each output can accommodate any number of the wavelengths on the input fiber. The WSS, like most classes of transparent optical switches, provides a connection between the input and output equally well for optical signals propagating from the input to an output, or propagating from the same output to the input. Therefore, the terms 'input' and 'output' are used merely as a convenience to describe the operation principle, but in practice they may be used as described or may be used in the reverse direction. There is also presently much consideration of a future WSS-class switch where a single component can route wavelengths among multiple inputs and multiple outputs, but as of yet it is only practical to provide such a capability as a higher-level system using multiple discrete components.

The OXC provides arbitrary permutation of a sequence of input ports among a usually equal number of output ports, although more generally a different number of output ports, as described below. This can for instance transform a set of input ports where each port carries only one specific wavelength from one specific fiber to a set of output ports where each output port can be programmed to carry any wavelength from any fiber. A simple branching switch provides basic 1×N switching where all the optical signals in the single input port are routed together to one of the N output ports. This switch is also reversible wherein N separate optical signals come into the N ports and the switch selects the signals form just one of those ports to be routed to the single 'input' port operating as an output.

A M×N multicast switch uses M 1×N splitters at the M input channels to distribute all the optical signals in each input port towards each of the N outputs. Each of the N outputs has its own M×1 selector switch to isolate the signals from the desired input port. The MCS has the basic advantage of having no optical filtering, so it is not only transparent to the data in each wavelength, it is transparent to the wavelength set configuration itself ("colorless"), i.e. wavelength channels do not need to conform to any specific wavelength grid specifications or channel bandwidths. The primary cost of this added transparency is the reduction of signal power due to the optical splitting on the input stages, and the MCS in some applications involves an array of optical amplifiers to boost the signal level and compensate the additional loss for each input.

Optical nodes in a communication network can comprise one or more of optical switching components from one or more of these classes. As networks become larger and more complex, scalability can be a significant issue generally and is particularly significant with respect to switching capability. Desirable optical nodes are constructed to be colorless, directionless and contentionless, as described further subsequently. It is the nature of these networks that there is significant variation in the nominally best configuration for each of these nodes. The present state of the art for optical switching components is such that each product tends to support a specific port count, realizing a similar component providing a different port count requires a separate product development. This discourages the diversification that would most appropriately address the needs of a variety of optical nodes and forces node design towards a less efficient, one-size-fits-all approach. There is a clear and present need for a means to more flexibly adapt the size of optical switching matrices using any one or more of the basic optical switching classes. The expandable switches described herein provide an important and innovative component for adaptable node design.

The optical switching function described herein can be scaled through the integration of the individual switching modules into an effective larger switching array assembled from individual optical circuit modules. The integration of the modules to provide the scalability can be performed in one dimension or two dimensions. To perform the integration in one dimension, the optical circuit can be designed with an additional set of ports corresponding either to the n input optical ports to form an effective expanded array with dimensions (b·n)×m switching or to the m output optical ports to form an effective expanded array with dimensions n×(c·m) switching. The parameter b is the number of n×m optical circuits that are interconnected with respect to the input lines to form the expanded switching array, and similarly parameter c is the number of n×m optical circuits that are interconnected with respect to the output lines to form the expanded switching array. With respect to optical integration in two dimensions, the optical circuit modules are formed with 4 sets of optical ports, with two sets of n ports and two sets of m ports. These optical circuits can then be assembled into an expanded array with $(b \cdot n) \times (c \cdot m)$ switching capability. Parameter n may equal but does not necessarily equal parameter m.

The individual optical circuits can comprise an array of (2×2 or 2×1) optical switches connecting n inputs with m outputs. Each 2×2 (or 2×1) optical switch provides an actuatable switch between an input line and an output line. Suitable actuatable optical switches are described further below, and generally the actuatable optical switched are controlled electronically to toggle the switch between interconnection configurations. With the array of actuatable optical switches in a module, a signal associated with one of the n input ports can be routed to one of the m output ports through the passage through the array of actuatable optical switches. The integration with another optical circuit through the connection of another set of n ports to the input ports of the second optical circuit provides access to a second array of n×m (2×2 or 2×1) optical switches so that effectively another m output ports can be accessed in the integrated expanded array. The integration can be continued. Similarly, the integration with another optical circuit through an additional set of m ports can provide access of the m output ports to a second set of n input ports in the integrated expanded array. Continuing the integration can lead to the $(b \cdot n \times c \cdot m)$ scalability in which parameters b, c, or both b and c is greater than 1. In the integrated expanded array there is an effective array of actuatable optical switches connecting b·n inputs with c·m outputs. Thus, the expandable optical circuit designs provide for great scalability capabilities. To match the scaling of the optical circuit modules with the targeted network switching function, generally $(b-1) \cdot n < N \leq b \cdot n$ and $(c-1) \cdot m < M \leq c \cdot m$, where N is the network inputs and M is the network outputs. Analogous reasoning can show that the numbers 'n' and 'm' do not need to be the same among all the components of the expanded array providing even greater flexibility over achievable configurations.

Any reasonable design of an actuatable optical switching element can be assembled into the array, as described further below. While optical circuit designed for the switching devices with an additional set or two sets of optical ports provide very desirable scaling capabilities, the passage of signals through the expanded array of 2×2 or 2×1 optical switches can result in an undesirable level of optical loss. Specifically, passage of an optical signal through the actuatable optical switches generally results in some optical loss even if the switch is in the "through" or non-switching mode. In the scaled integrated switch, an optical signal can pass through a significant number of actuatable switches even if switching is only performed at one of the actuatable optical switches. Thus, in some embodiments, the planar optical circuits or other expandable switch designs comprise bypass optical pathways that provide the capability to bypass a set of actuatable optical switches to reduce corresponding loss if a particular input or output line does not undergo any switching within the particular module at that time. Control of the direction of an optical signal alternatively along the bypass pathway or the switched pathway can be itself controlled with a single 1×2 optical switch. Bypass capability can be established for input lines, output lines or both.

In the description of the topology of the layout of the actuatable switches, the term array is used in its general sense and not necessarily directed to a matrix lay out. Two specific embodiments are described in more detail below. An embodiment of an expandable cross connect switch has a matrix of 2×2 switches in the logical or topological layout of the cross connect n×m expandable switch. In another embodiment, an expandable multicast switch is described with a branching layout of splitters that meet an array of 2×1 switches to couple the expanded n×m split inputs into the m outputs in which the array of switches are not arranged in a matrix configuration. Of course, the physical layout of the actual devices generally does not resemble the topological layout of the devices due to the aspect ratios, packing, and other practical considerations.

The scalable optical switch can be designed for integration into a colorless, directionless, and contentionless (CDC) network node. The reference to colorless refers to the ability to drop or add a particular light wavelength at any port. The reference to directionless refers to the ability to connect to all directions from local transponders, where each 'direction' directly corresponds to a particular inbound/outbound fiber pair connecting to the node. The reference to contentionless indicates that the node can resolve the problem of two distinct optical signals converging on the node on different fibers but containing the same wavelength and bound for a common optical pathway. This is commonly resolved by rerouting one of the wavelengths to local traffic where it can be electronically switched to another available wavelength and re-inserted into the desired pathway generally connected to an outbound fiber. The scalable switch device described herein generally satisfies these features and can correspondingly be integrated into a CDC network node.

The schematic view of an N×M optical switching cross-connect (OXC) within an optical network is shown schematically in FIG. 1. N×M optical switch 100 is optically connected to N input optical lines 102, e.g., optical fibers, and M output lines 104, e.g., optical fibers. N, the number of input lines, may or may not equal M, the number of output lines. Due to the scalability of the optical switching function as described herein, N and M generally can be relatively large, and in embodiments of particular interest N and M are independently each at least about 8, in further embodiments at least about 16, and in other embodiments at least about 32 or larger or intermediate even or odd integer values. Similar comments on ranges of input and output lines apply to other switching embodiments described herein. A person of ordinary skill in the art will recognize that additional ranges of optical lines within the explicit ranges above are contemplated and are within the present disclosure.

In general, the optical switching device can be placed at any convenient location within an optical network. From that perspective, signals transmitted within the individual input lines and output lines may or may not be intended to carry individual communications, and these can be combined signals carried within a band of wavelengths. In some embodiments, the optical switches are associated with MUX/DeMUX capabilities to split and/or combine optical signals within an optical band. The expressions MUX and deMUX are used herein respectively for multiplexing and demultiplexing functions, as is generally accepted in the art. MUX and DeMUX functions can be performed with planar Arrayed Waveguide Gratings (AWG) or other desirable dispersive elements. In some embodiments, the input signals can comprise signals intended for a set of users, and the output lines represent optical branches directed to a specific user, which corresponds to use of the switching element at the end of an optical network for directing signals to end users. The input and output designations can be arbitrary in the sense that signals can be directed through the switch in either direction, such that the switching function is optically reversible. But the input and output designations are used to describe groupings of optical lines that are routed between each other regardless of the direction of the transmissions. In other embodiments, the switch can be used to direct multiplexed or combined signals at a branch along an optical network away from any users.

Although this invention can be employed to improve various means of optical switching, the scalable optical switches as described herein are exemplary of an assembly of optical circuits. The optical circuits are correspondingly designed with appropriate connectivity to provide the scalability. The optical circuits are interconnected as modules to provide the desired level of optical switching. The invention can be particularly advantageous when the optical circuits are integrated as planar optical circuits.

Figure 2:
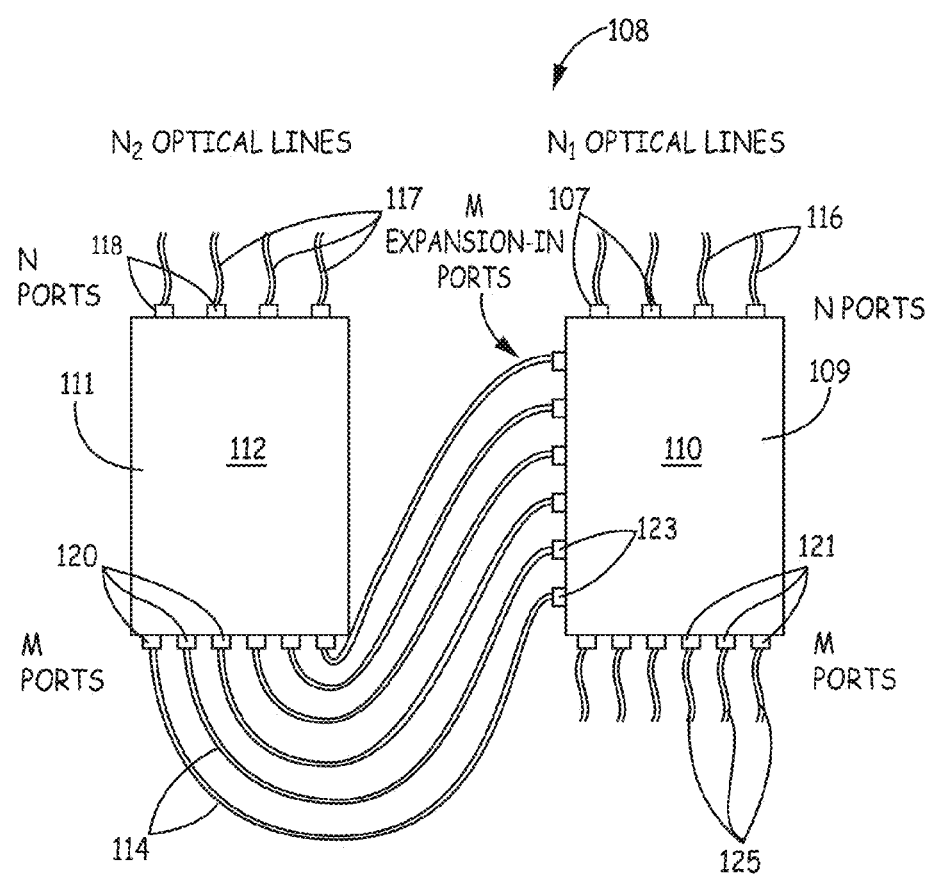
FIG. 2 depicts a switch assembly having at least one switch equipped with expansion ports.

The interconnection of two optical circuits to provide scaling with respect to input lines is shown schematically in FIG. 2 in a conceptual framework that is expanded upon in detail in the context of some specific embodiments. Optical switching functions are accomplished, for instance, by assembly 108 having a first switch 109 having optical circuit 110 and second switch 111 having optical circuit 112. Circuit 110 comprises N input ports 107, M output ports 121 and M expansion-in ports 123. Similarly, circuit 112 comprises N input ports 118 and M output ports 120. Circuits 110, 112 are interconnected with M expansion-in ports of first switch 109 being connected with M output ports of second switch 111 through optical interconnections 114, such as optical fibers or other suitable optical connections. $N_1$ input optical lines 116 are connected to planar optical circuit 110, and $N_2$ input optical lines 117 are connected to planar optical circuit 112. M ports 121 of circuit 110 have output lines 125. Thus, together assembly 108 of optical circuits 110, 112 provides switching between $N_1+N_2$ input ports and M outputs. This schematic diagram demonstrates a case where the number of total inputs ($N_1+N_2$) is greater than the total number of switched outputs. This embodiment demonstrates how expansion-in ports can be used to effectively expand a number of inputs with specific sized switches available that may individually have lower capacity. For instance, the use of a switch with expansion ports in the assembly changed a 4×6 switch into an 8×6 switch, which doubled the number of switched inputs.

Figure 3:
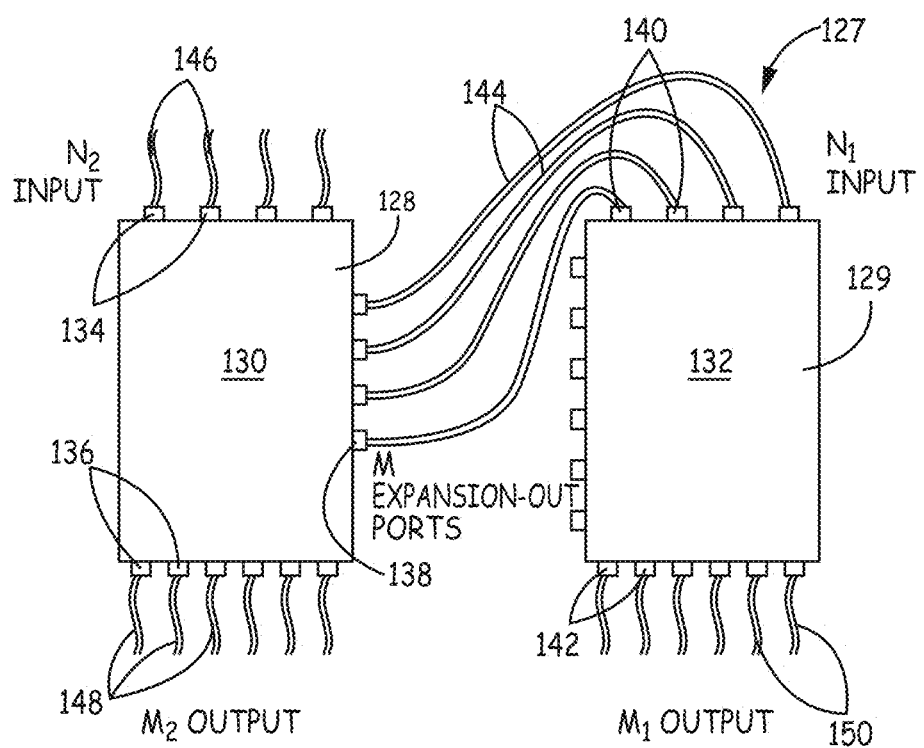
FIG. 3 depicts an alternative embodiment of a switch assembly having at least one switch equipped with expansion ports.

Scalability with respect to output lines is shown schematically in FIG. 3. In the embodiment of FIG. 3, optical switching is provided by assembly 127 having an integration of switches 128 and 129. Switch 128 comprises optical circuit 130. Switch 129 comprises optical circuit 132. Circuit 130 comprises N input ports 134, M output ports 136, and M expansion-out ports 138. Similarly, circuit 132 comprises N input ports 140 and M output ports 142. Circuits 130, 132 are interconnected with expansion-out ports 138 to inputs 140 through optical interconnections 144. $N_2$ optical input lines 146 and M2 optical output lines 148 are also connected to circuit 130. M1 output lines 150 are further connected to circuit 132. This embodiment demonstrates a case where the number of total outputs ($M_1+M_2$) is greater than the total number of inputs ($N_1$ or $N_2$), although alternative embodiments may involve a greater number of inputs relative to outputs or equal numbers. This embodiment also demonstrates how expansion-out ports can be used to expand an effective number of outputs. Specifically, use of a switch with expansion ports was used to change a 4×6 switch into a 4×12 switch, which doubled the number of switched outputs.

Figure 4:
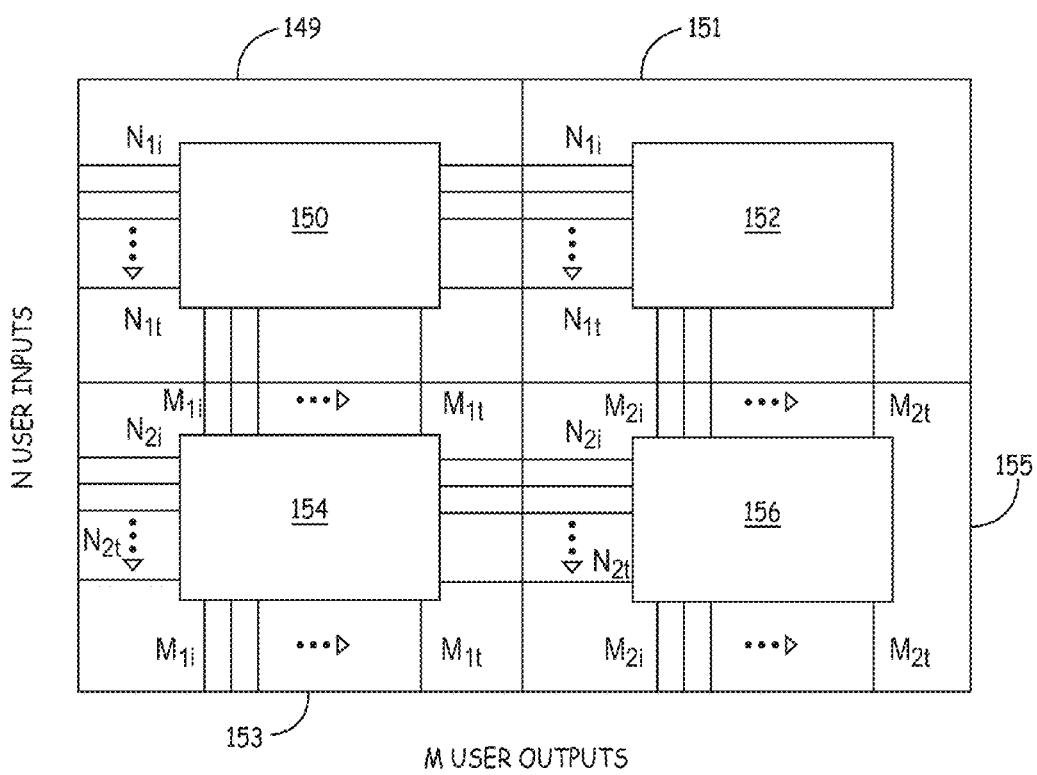
FIG. 4 depicts four modules interconnected to provide an N×M switch.

FIG. 4 depicts the connection of four modules 149, 151, 153, 155 each comprising an optical circuit that provides scalability with respect to both input lines and output lines. The switching function is provided by optical circuits 150, 152, 154, 156. Optical circuit 150, such as an optical circuit, is optically connected with a number $N_1$ connections to optical circuit 152 and with a number $M_1$ connections to optical circuit 154. The numbers $N_1$ and $M_1$ vary from $N_{1i}$ to $N_{1f}$ and $M_{1i}$ to $M_{1f}$, respectively. Optical circuit 154 is optically connected with $N_2$ connections to optical circuit 156, and optical circuit 152 is optically connected with $M_2$ connections to optical circuit 156. The numbers $N_2$ and $M_2$ vary from $N_{2i}$ to $N_{2f}$ and $M_{2i}$ to $M_{2f}$, respectively. If N is the total number of user input connections, then $N_1+N_2=N$, or $N_1+N_2$ is greater than N if the integrated modules have excess unused capacity. Similarly, if M is the total number of output connections, $M_1+M_2=M$, or $M_1+M_2$ is greater than M if the integrated modules have excess and unused capacity. Optical circuit 150 provides optical switching between $N_1$ input lines and $M_1$ optical output lines, and optical circuit 152 provides optical switching between $N_1$ optical input lines and $M_2$ optical output lines. Correspondingly, optical circuit 154 provides optical switching between $N_2$ input lines and $M_1$ optical output lines, and planar optical circuit 156 provides optical switching between $N_2$ optical input lines and $M_2$ optical output lines. Thus, together optical circuits 150, 152, 154, 156, which can be planar optical circuits, provide switching between N input optical pathways with M output optical pathways. The scalable aspect of interconnection of the modules provides that N and M may be independently chosen, e.g., N=M, N>M, or N<M. While FIG. 4 depicts 4 expandable optical circuits, the expansion ability provides that additional optical circuits can be correspondingly interconnected to further increase input capability, output capability or both input and output capability.

FIGS. 2-4 schematically show scalability of optical switching within the context of optical switch 100 of FIG. 1. In particular, planar optical switches are designed for integration as modules to accommodate expansion with respect to the number of input lines and/or the number of output lines. While FIGS. 2-4 are directed to disclosing the integration with respect to two modules in the input dimension and/or two modules in the output dimension, the scalability can be similarly extended in the input dimensions and/or the output dimension to include greater than two switching modules in each dimension, such as three modules, four modules and so on. With respect to FIGS. 2-4, the individual switching module has been depicted schematically.

Figure 5:
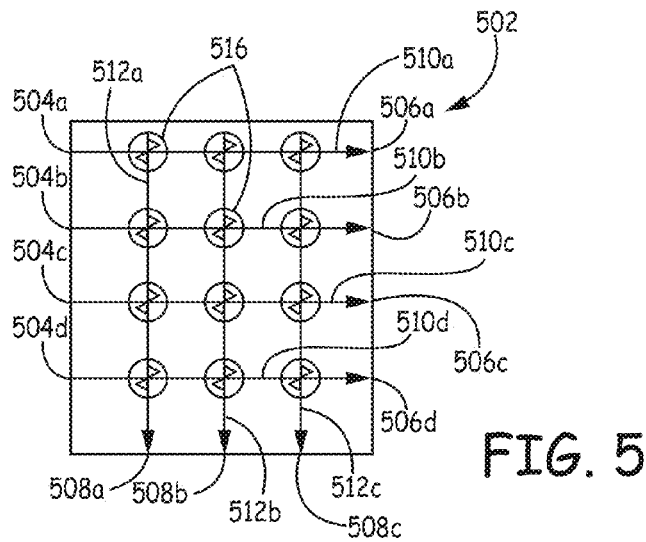
FIG. 5 depicts an expandable switching module.

An example of a switching module is an array of optical switches. In these embodiments, the switching modules each generally comprise an n×m array of (2×2) actuatable optical switches that provide for optional switching from an input optical line to an output optical line. FIG. 5 depicts switching module 502 having four input channels 504a, 504b, 504c, 504d; four downstream expansion-out channels 506a, 506b, 506c, and 506d; and three drop ports 508a, 508b, and 508c. Input channels 504a, 504b, 504c, and 504d are connected to downstream expansion-out channels 506a, 506b, 506c, and 506d by paths 510a, 510b, 510c, and 510d, respectively. Each of input channels 504a, 504b, 504c, and 504d are switchably connected by paths 512a, 512b, and 512c to each of drop ports 508a, 508b, and 508c. Cross-point switches 516 are located at the points where paths 510a, 510b, 510c, and 510d cross paths 512a, 512b, and 512c.

Operation of the basic switch matrix is straightforward. Cross-point switches 516 can be designed to normally allow the optical paths to cross each other unaffected, and the majority of the switches in the matrix may be in this state for any given configuration. When a particular input channel 504a, 504b, 504c, or 504d is selected to be routed to a particular drop port 508a, 508b, or 508c, a switch 516 at the single crossover point for those two waveguides is activated to reroute the input channel. For any valid configuration for a cross connect switch, no more than one switch in any row or in any column is in a fully switched state, as shown in FIG. 5. When the switch is in the switched state, a signal from the input for that drop port is also rerouted to the downstream portion of that input channel, so functionally the device can perform both add and drop at the same time. This behavior could be provided by most any optical switching solution, but it rarely if ever is, so it is presumably generally not desired. This behavior can also support certain other functions in more complex switching assemblies.

In some embodiments, an expandable switch has a plurality of bypass lines. One advantage of a bypass line is that a signal can bypass switches/junctions to reduce signal loss. One embodiment of a bypass line provides that 1×2 (or 2×1) bypass switches are placed on input lines and/or drop lines to provide for bypass of a circuit for when no switching takes place for the particular line in the particular circuit. For planar optical circuits, arrays of bypass 1×2 optical switches can be placed on the same optical circuit chip as the N×M expandable switch or on a separate optical circuit chip. If the intended Drop port for that input channel is on the present module, the signal will be routed to the row of switches as usual. If not, the signal channel will be routed through a bypass channel past all the switches to the Expansion Out port. Likewise, each Drop port can be connected through a 2×1 switch. If the input channel intended for that Drop port is on the present module, the 2×1 switch will select the waveguide coming from the column of crosspoint switches for that port. If not, it will select a channel coming from the Expansion In port bypassing the column of crosspoint switches.

Figure 6:
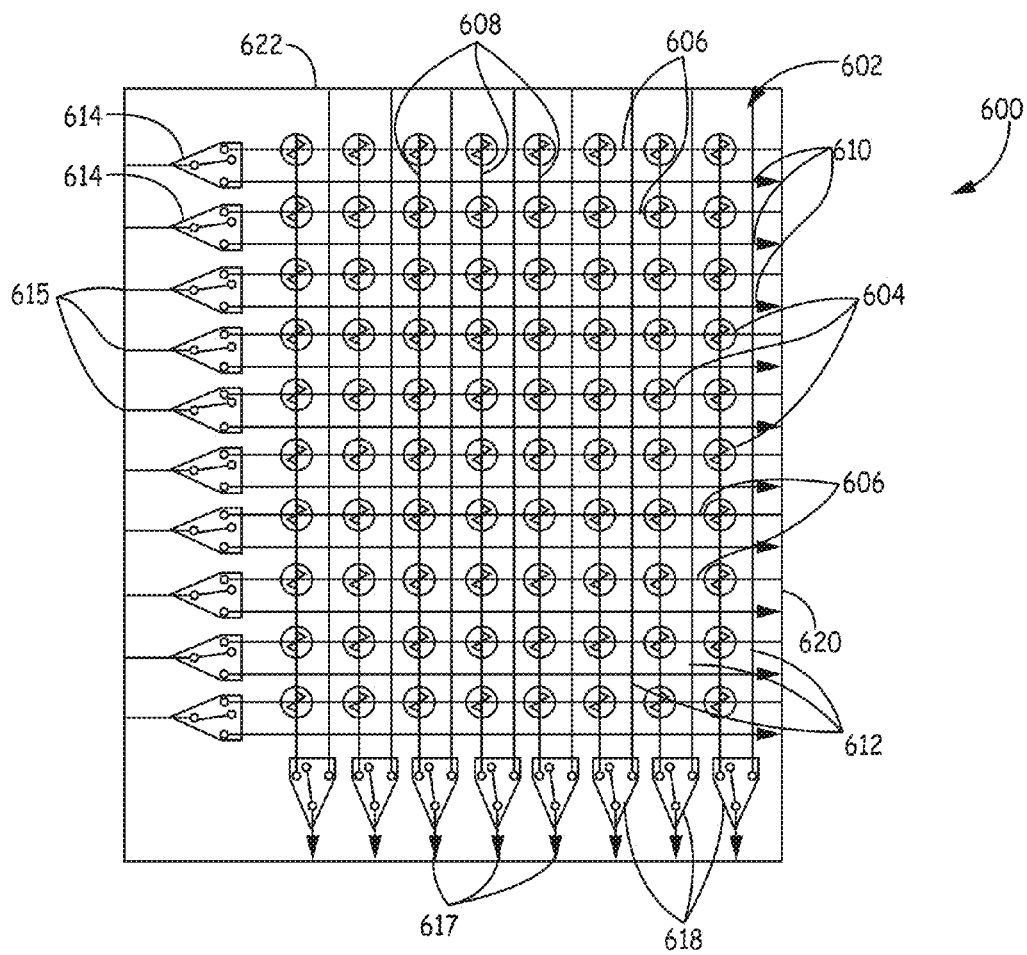
FIG. 6 depicts an expandable switch that has a plurality of bypass lines.

An embodiment of an expandable switch that has a plurality of bypass lines is depicted in FIG. 6. Expandable switch 600 comprises array 602 of optical cross-point switches 604 placed at the cross points of input channel selectable lines 606 and drop lines 608. In the depicted embodiment, channel selectable lines 606 and drop lines 608 pass through a plurality of cross-point switches 604 which have a position for allowing signals in selectable lines 606 and/or drop lines 608 to pass unswitched therethrough. One or more bypass lines may be provided for one or more channel line and/or one or more drop line. In FIG. 6, there are channel bypass lines 610 and drop bypass lines 612. Input 1×2 switches 614 provide for input lines 615 to be connected to switch 614 so that switch 614 is operable to switch light from input lines 615 to a channel bypass line 610 or a channel selectable line 606. Drop 2×1 switches 618 allow for either a drop line 608 or a drop bypass line 612 to be selected and passed to output lines 617. Alternatively, switches may be provided that have continuous adjustability such that a switch can direct the input signal in a limits to select none or both lines. Bypass lines are connectable at an expansion port at one end and are connected to a bypass switch at the other. Channel bypass lines 606 have connectivity at Expansion-output ports 620 or other connectivity device is provided for connection to another expandable switch or some other device. Drop bypass lines 612 have connectivity to receive input at Expansion-input ports 622. In use, one or more expandable switches 600 are connected with Expansion-output ports 620 optically communicating with input lines 615 and/or output lines 617 optically communicating with Expansion-input lines 622. After assembly of a plurality of expandable switches, a signal that enters a switch 614 is routed to a drop-port if the desired drop-port is on the switch or is passed via a bypass line to another switch. A designation as an input line versus a drop line is arbitrary for devices with switches that pass light in either direction: accordingly, the input and drop lines may be reversed. To simplify the drawing, only a portion of equivalent components are labeled with reference numbers.

Figure 7:
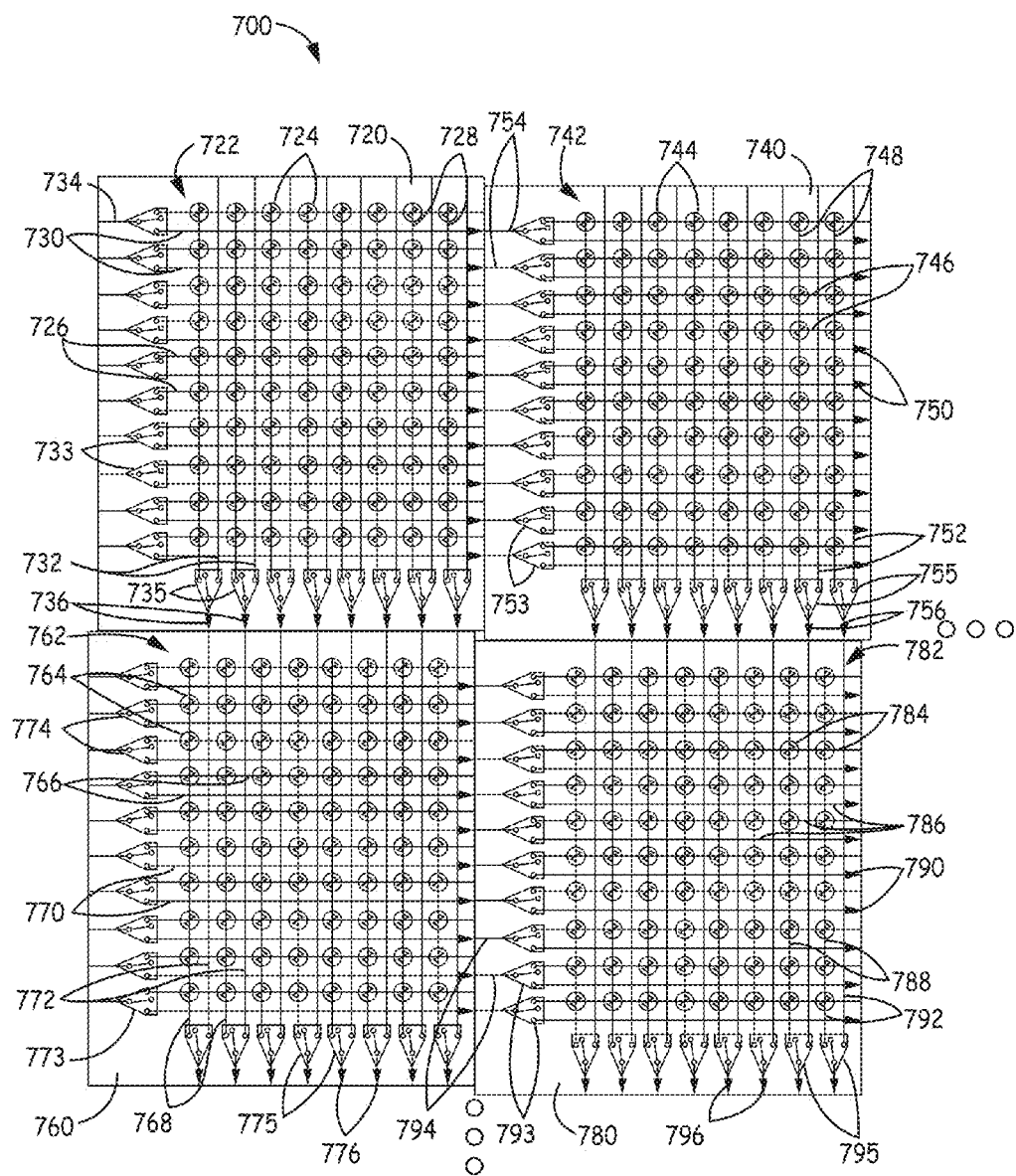
FIG. 7 depicts a group of expandable switches assembled together.

FIG. 7 depicts a group of expandable switches assembled together. Switch assembly 700 has expandable switch modules 720, 740, 760, 780. Expandable switch modules 720, 740, 760, 780 comprise arrays 722, 742, 762, 782 of optical cross-point switches 724, 744, 764, 784 placed at the cross points of input channel selectable lines 726, 746, 766, 786 and drop lines 728, 748, 768, 788, channel bypass lines 730, 750, 770, 790 and drop bypass lines 732, 752, 772, 792. Input 1×2 switches 733, 753, 773, 793 are connected to switch light signals from input lines 734, 754, 774, 794 to a channel bypass line 730, 750, 770, 790 or a channel selectable lines 726, 746, 766, 786. Drop 2×1 switches 735, 755, 775, 795 allow for either a drop line 728, 748, 768, 788, or a drop bypass line lines 732, 752, 772, 792 to be selected and passed to output lines 736, 756, 776, 796. Alternatively, switches may be provided that provide continuous range switching function.

Channel bypass lines 730, 770 are optically connected to input lines 754, 794, respectively. Drop 2×1 switches 735, 755 are optically connected to pass signals to drop bypass lines 772, 792. Ports (schematically shown as edges of the switches intersecting optical paths) are provided for connection to user devices and/or to other expandable modules. The term user devices is a broad term that encompasses networks, subnetworks, nodes, specific devices, network communications devices, and end-user devices. Inlet ports provide optical connection to input lines 734, 754, 774, 794; in this embodiment, lines 734 and 774 are available for connection to user devices and ports for input lines 774 and 794 are connected to other expansion modules. Expansion-input ports provide optical connectability to drop bypass lines 732, 752, 772, 792; in this embodiment, lines 732 are dormant and lines 772 are available for receiving optical signals from expansion-in ports to provide for directing signals from inputs 734 to outputs 776. Expansion output ports provide optical connectability to channel bypass lines 730, 750, 770, 790; in this embodiment, lines 750 and 790 are dormant and ports for lines 730 and 770 are connected through expansion out ports to input ports of switches 740 and 780, respectively.

In the actual chip layout, the switches on the In port add one stage and the switches on the Drop port also add one stage. In this way, larger switch matrices can be arbitrarily (at least in terms of functional geometry) scaled up from a single common module.

Also consider that 1×2 switches could be integrated on the Expansion Out terminals of the switch module to enable each module to connect to two downstream drop modules and likewise the Expansion In terminals could have 2×1 switches and thus each module could forward drop channels from two additional channel blocks. This would allow matrices to be built up from a single module type along the branches of a tree geometry rather than sequential layout, likely improving overall optical efficiency. Also, the switches on the Expansion ports would overlap the switches on the In and Drop ports and hence would not add any stages to the physical layout in planar integrated module, hence imposing very little increase in the size of the planar chip.

Figure 8:
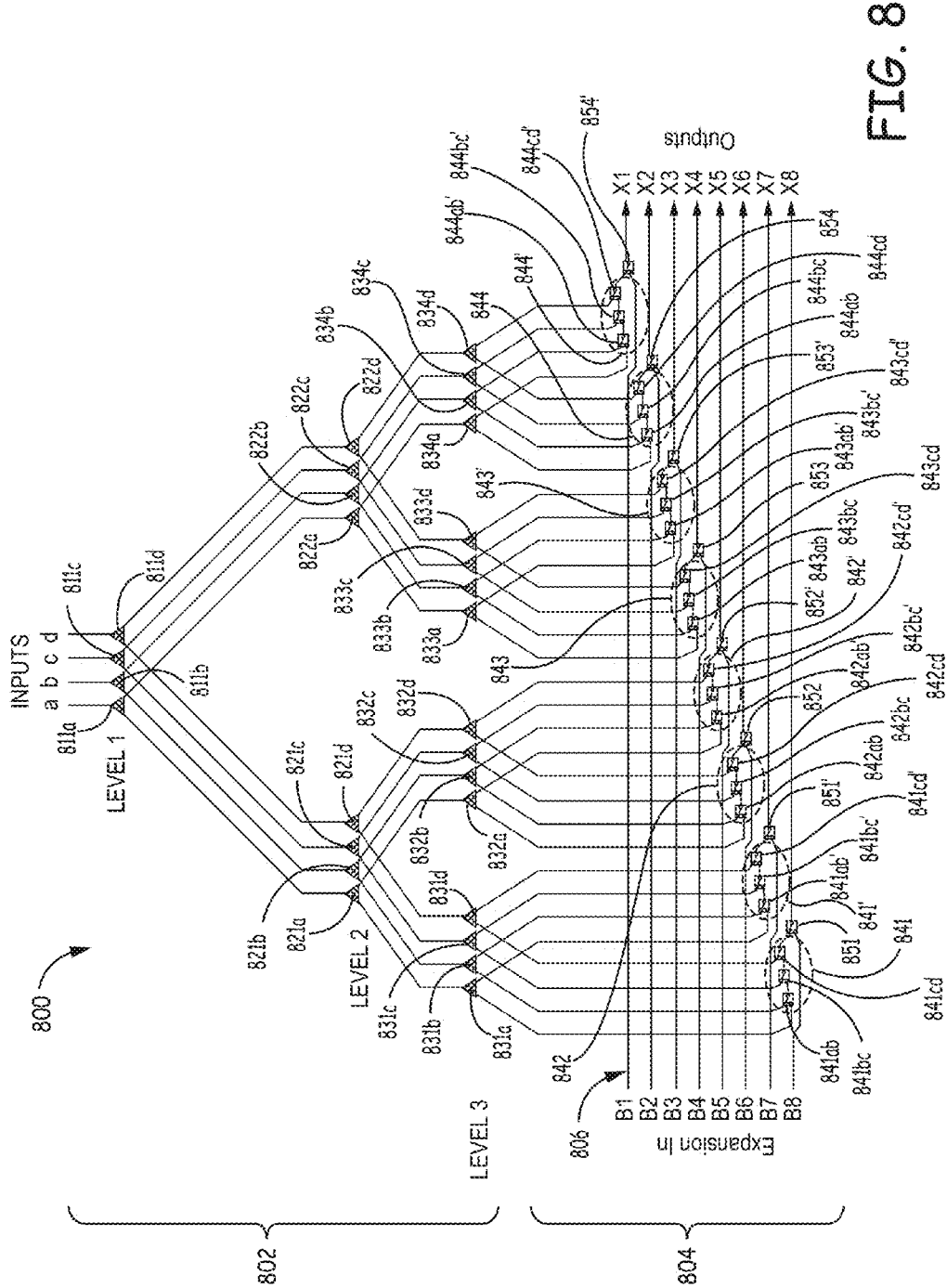
FIG. 8 depicts an expandable multicast switch.

FIG. 8 depicts an embodiment of an expandable multicast switch. Components of the switch are arranged to illustrate their interconnections and how paths, switches, and splitters can be made to cooperate to provide expandability in a multicast application. Artisans reviewing this illustration will be able to make physical device layouts as described further below. Expandable multicast switch 800 has splitter tree 802 and switching section 804. Splitter tree 802 multiplies optical inputs a, b, c, d so that each one is connected to each optical output line X1-X8. Input ports (not shown) are provided to provide optical connections from the device interface to inputs a-d. Splitter tree 802 has three levels to appropriately split the signal into appropriate number of optical paths, although a different number of levels can be used depending on the number of input lines and desired multicasting into particular output optical lines. Level 1 has an optical splitter on each input, with splitters 811a, 811b, 811c, 811d splitting input lines a, b, c, d, respectively to thereby make 2 branches for each input, for a total of 8 branches. The split signals are passed to level 2 splitters 821a, 821b, 821c, 821d, 822a, 822b, 822c, 822d that split the signals into 2 branches for each input to that level, for a total of 16 branches and a total of 4 signals for each of inputs a-d. The split signals are then passed to level 3 splitters 831a, 831b, 831c, 831d, 831a', 831b', 831c', 831d', 832a, 832b, 832c, 832d, 832a', 832b', 832c', 832d, 833a, 833b, 833c, 833d, 833a', 833b', 833c', 833d, 834a, 834b, 834c, 834d, 834a', 834b', 834c', 831d', that each split the signals into 2 branches thereby making 32 branches and a total of 8 signals for each of inputs a-d. Switching section 804 has Expansion-in ports (schematically shown as the end of corresponding optical paths) connected to bypass lines 806 labeled, which are connected to bypass switches as noted below. Output lines 808 labeled X1-X8 each optically connected to an Output port (schematically shown as the end of the output lines). Switching blocks 841, 841', 842, 842', 843, 843', 844, 844' provided switchable connections from splitter tree 802 to the output lines 808. Each switching block connects inputs a-d to a bypass switch 851, 851', 852, 852', 853, 853', 854, 854' that are optically connected to switch between the signal from splitter tree 802 of a bypass line 806 for passage to output line 808. Specifically for block 841, for instance, optical switch 841ab provides for input a or b to be chosen, with the chosen signal a/b being passed to switch 841bc that provides for switching between a/b or c, with the chosen signal a/b/c being passed to switch 841cd that provides for switching between a/b/c and d. Switching block 841 then passes one of the signals a-d to bypass switch 851, which provides for a choice between a/b/c/d and bypass path 806 labeled B8. The signal selected by bypass switch 851 then passes to output line 808 labeled X8. In use, one or more expandable switches may be connected with outputs labeled X1-X8 in optical communication with expansion-in ports labeled B1-B8. Inputs a-d are available for switching so that any outlet X1-X8 can carry any one of inputs a-d. Outlets X1-X8 can alternatively carry a signal received from expansion-in ports. In use, optical connections are made to one or more expansion-in ports, to one or more input ports, and to one or more outlet ports. Signals passing into the input ports and/or expansion-in ports are selected to pass out of any of outputs 808. Note also there is no restriction against bypass switches 851 providing continuous-range switching to support applications where additional combining of input signals with expansion-in signals is desired.

While FIG. 8 is shown with specific numbers of input optical lines and output optical lines, other embodiments can be similarly designed with different numbers of inputs and outputs. The splitter tree can be correspondingly changed, and redundant split optical lines can be formed if a convenient splitter tree provides a greater number of optical lines than the number of output lines. Redundant optical lines can be dormant and just guide any optical signal away from any interfering propagation. Alternative designs of switching blocks are described below.

Figure 9:
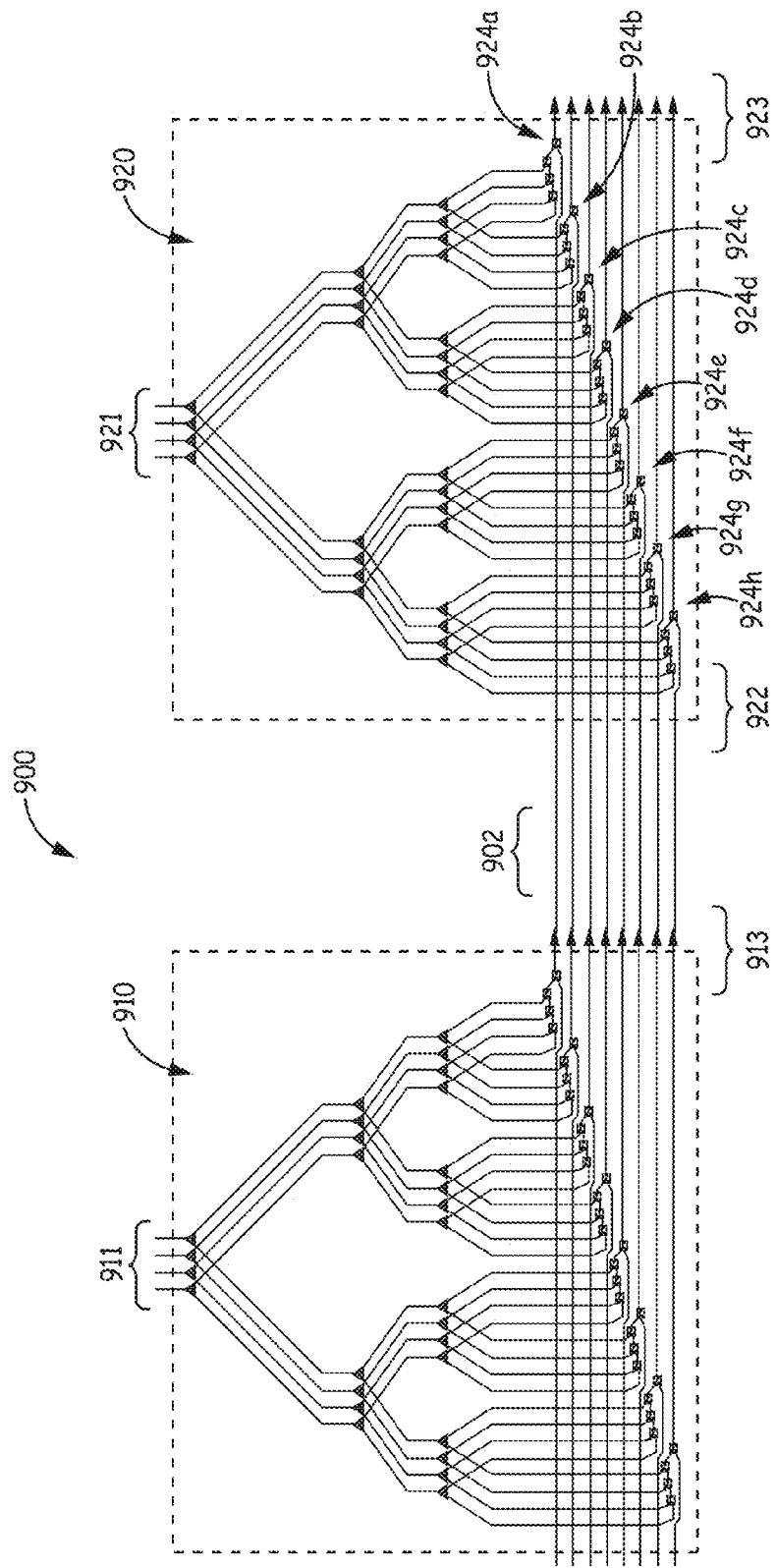
FIG. 9 depicts an assembly of expandable multicast switches.

FIG. 9 depicts assembly 900 of terminal expandable switch module 920 and initial expandable switch module 910, each expandable switch module being essentially of the embodiment described as FIG. 8. The outputs 913 of initial module 910 are optically coupled to the corresponding expansion-in ports 922 of terminal module 920 by means of light paths 902. Expandable switch modules 910 and 920 may be for instance individual switching cores on a common planar substrate in a photonics integrated circuit (PIC) and the interconnecting light paths 902 could be optical waveguides on the same substrate. In another example, expandable switch modules 910 and 920 may be for instance individually packaged switch modules based on separate PICs and interconnecting light paths could be single-mode optical fibers either as a set of individual strands or as a fiber ribbon. Each output in output set 923 can be configured to selectively connect to one of the inputs 921 of terminal module 920 by setting the associated bypass switch in 924a-g to connect to one of the local inputs as detailed in the description of FIG. 8. Alternatively, each output in output set 923 can be configured to selectively connect to one of the inputs 911 of initial module 910 by setting the associated bypass switch in 924a-g to connect to the associated expansion-in port as detailed in the description of FIG. 8, then further setting the appropriate switch elements in switch module 910 to connect the selected input from inputs 911 to the output in outputs 913 that is connected to the corresponding expansion-in port in expansion-in ports 922. Thereby, a 4×8 expandable MCS 920 can be upgraded by attaching a second 4×8 MCS 910 to the expansion-in ports 922 forming an assembly 900 of two 4×8 switch modules that provides the same functionality as a dedicated 8×8 MCS.

Figure 10:
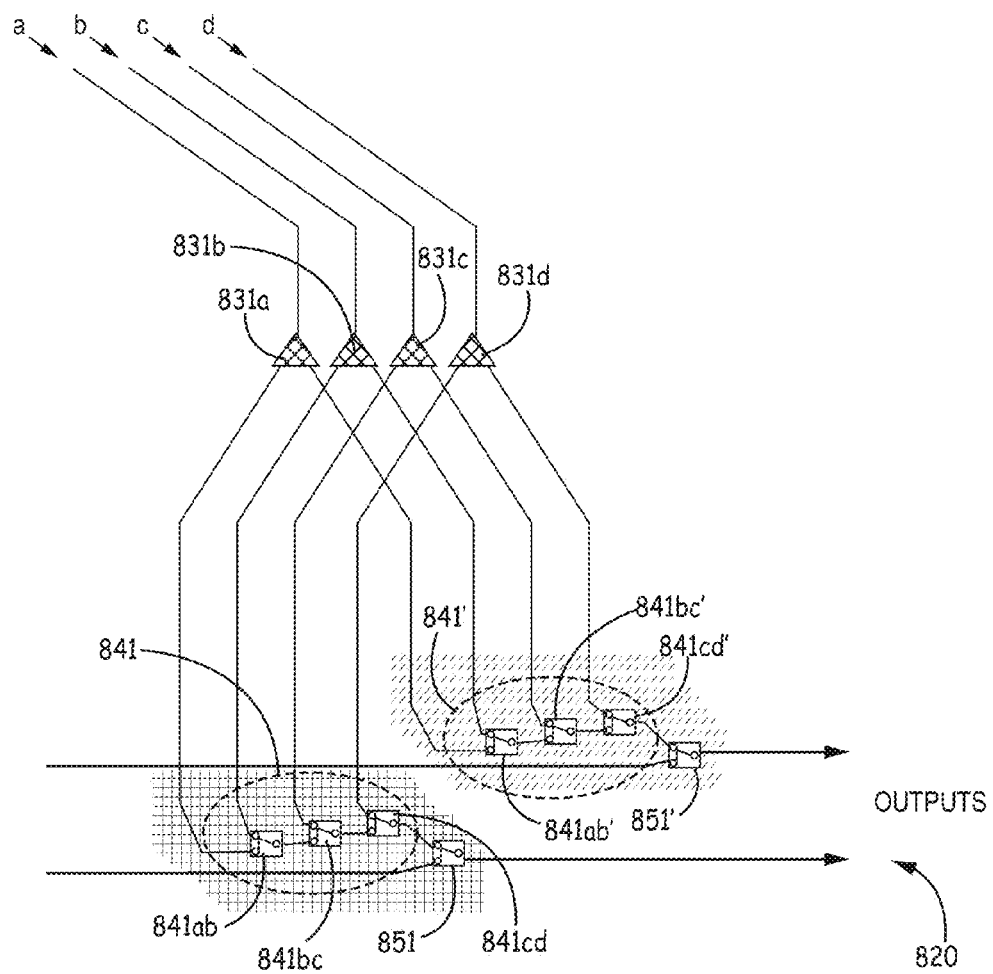
FIG. 10 depicts a subsection of the switch of FIG. 8.

FIG. 10 is an enlarged view of a subportion of FIG. 8 depicting switching blocks 841, 841' joining the splitting tree with bypass switches. Arrows a, b, c, d, depict inputs passed from level three of the splitting tree. In this embodiment, each switching block receives 1 input from each of the four potentially available inputs a-d. Each bypass switch provides a choice to output one of a-d or a signal in the bypass line. The switching blocks are arranged in a serial configuration to sequentially select between a signal from an added optical line.

Figure 11:
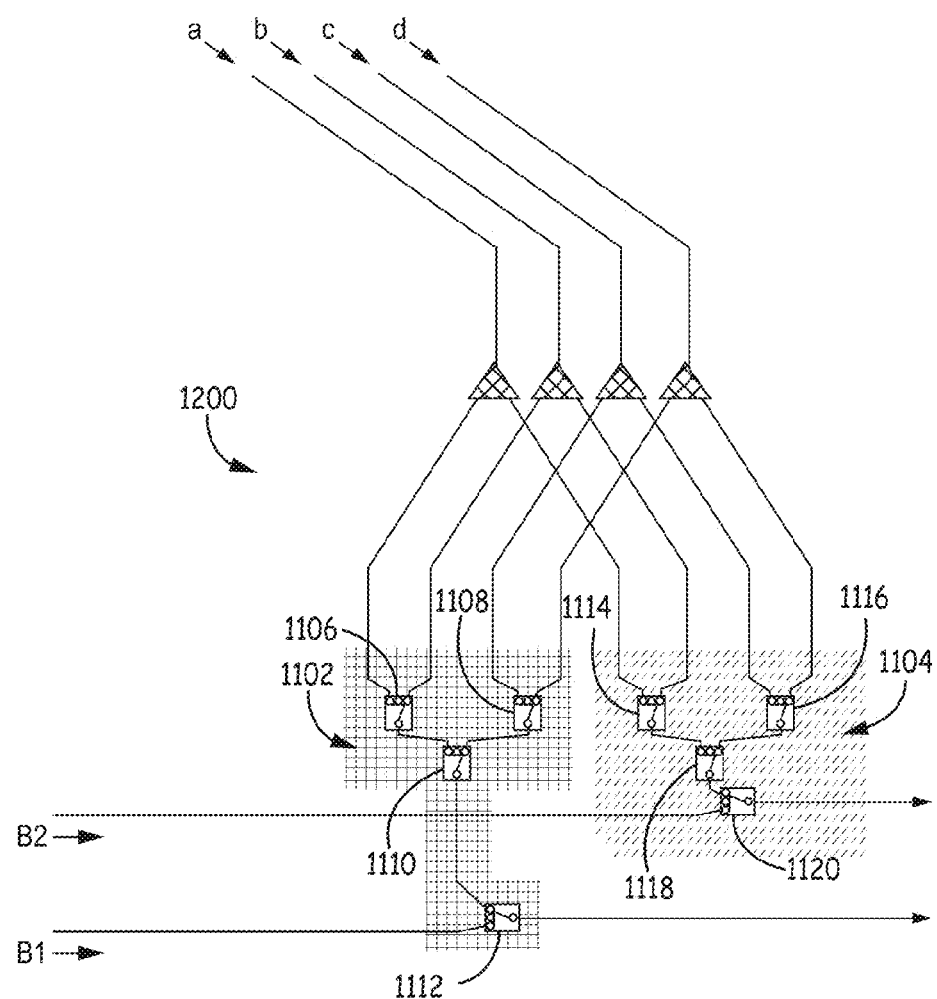
FIG. 11 is an alternative expandable 4×1 circuit for a multicast switch.

FIG. 11 is an alternative subportion for an expandable switch. Switching blocks 1102, 1104 are arranged in a tree configuration and are a functionally-equivalent alternative to switching blocks 841 and 841' of FIG. 10. In block 1102, switch 1106 is selectable between a and b inputs to provide output a/b and switch 1108 is selectable between c and d inputs to provide output c/d. Switch 1110 is selectable between a/b and c/d to provide an output a/b/c/d to bypass switch 1112, which is, in turn selectable between a/b/c/d or bypass B1 signal. Switches 1114, 1116, 1118, 1120 are similarly configured to provide selectivity between any of a-d and B2.

Figure 12:
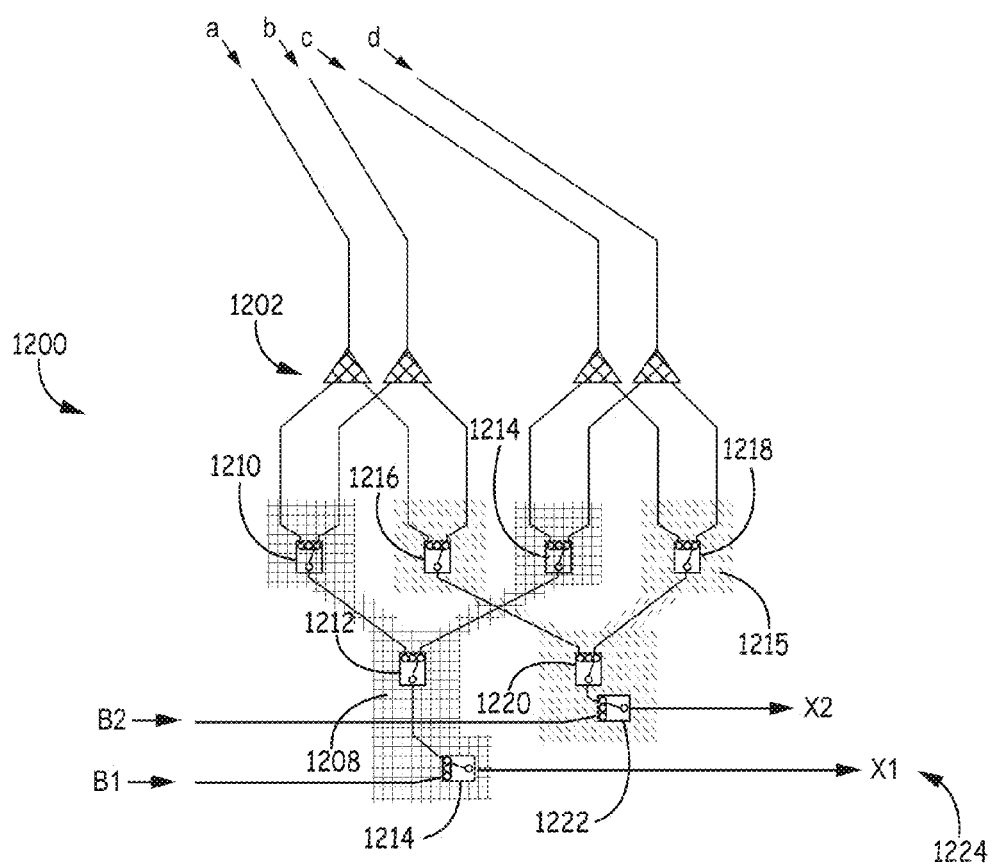
FIG. 12 is another alternative expandable 4×1 circuit for a multicast switch.

FIG. 12 is an alternative subportion for an expandable switch. Switching blocks 1208, 1210 are arranged in a tree configuration and depict an alternative distributed layout of switching blocks 1102 and 1104 in FIG. 11. Switching block 1208 has switches 1210, 1211, 1212 that are associated with bypass switch 1214. Switching block 1215 has switches 1216, 1218, and 1220 that are associated with bypass switch 1222. Switch 1210 is selectable between and b to pass a/b to switch 1212. Switch 1211 is selectable between c and d to provide output c/d that is passed to switch 1212, which, in turn selects between a/b and c/d. Associated bypass switch 1214 is selectable between a/b/c/d and B1. Switching block 1214 and associated bypass switch 1222 are similarly selectable to direct a/b/c/d/B2 to an output 1224.

Figure 13:
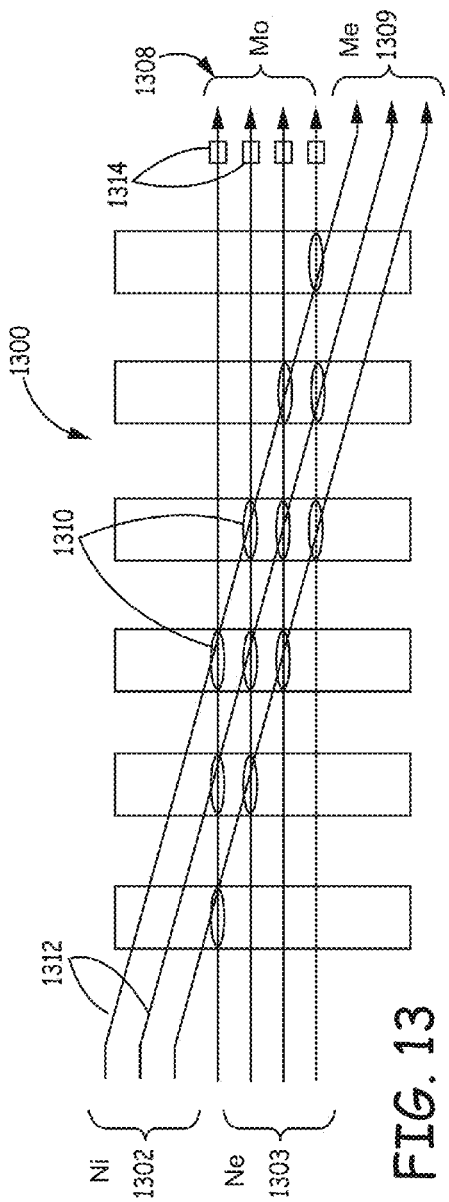
FIG. 13 is a conceptual arrangement of an expandable 4×3 planar lightwave circuit (PLC) cross connect.
Figure 14:
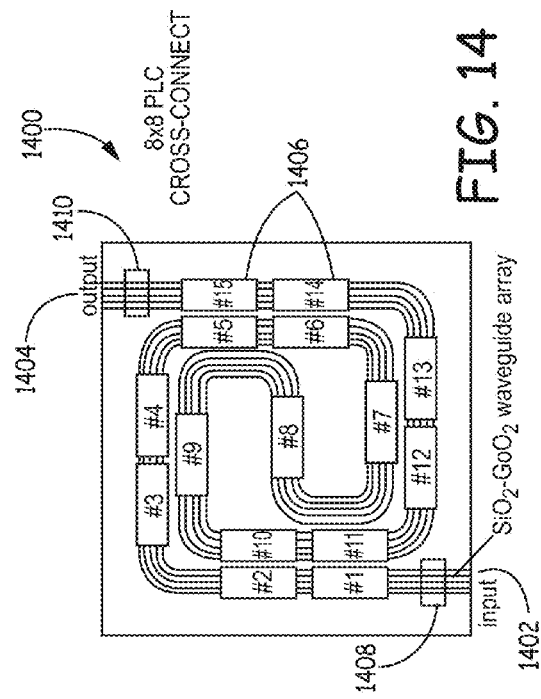
FIG. 14 is an embodiment of a layout for an expandable PLC.
Figure 15:
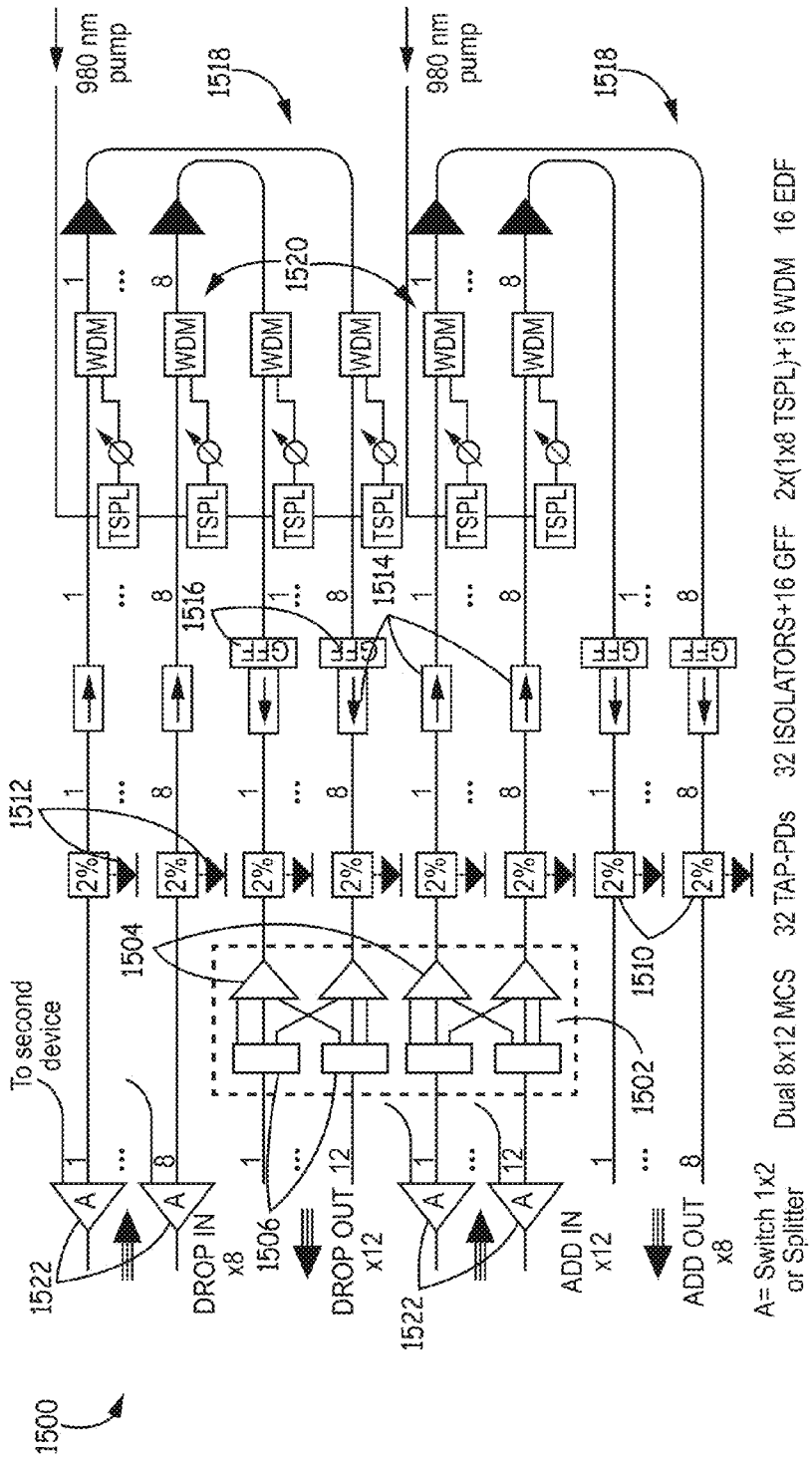
FIG. 15 is a functional diagram of an expandable switch.
Figure 16:
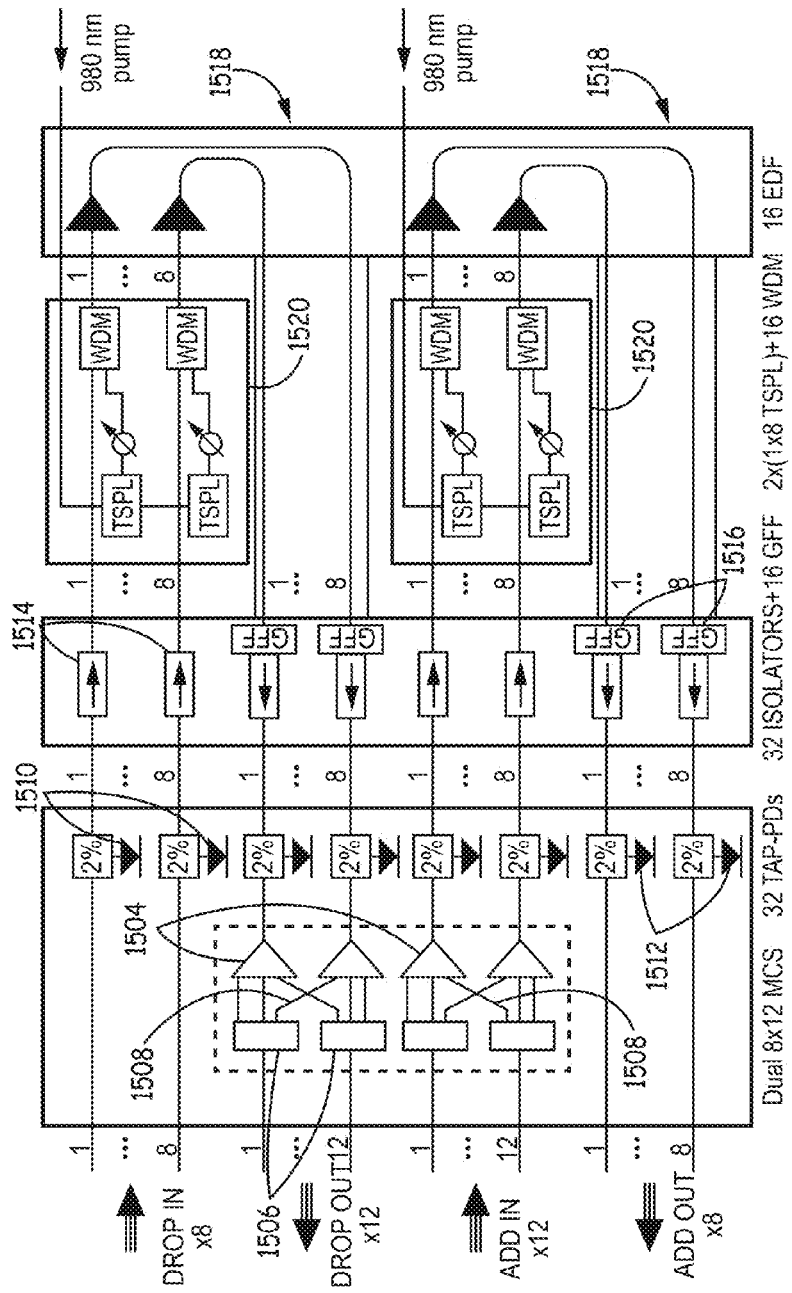
FIG. 16 is a functional diagram of optical modules of the switch of FIG. 15.
Figure 17:
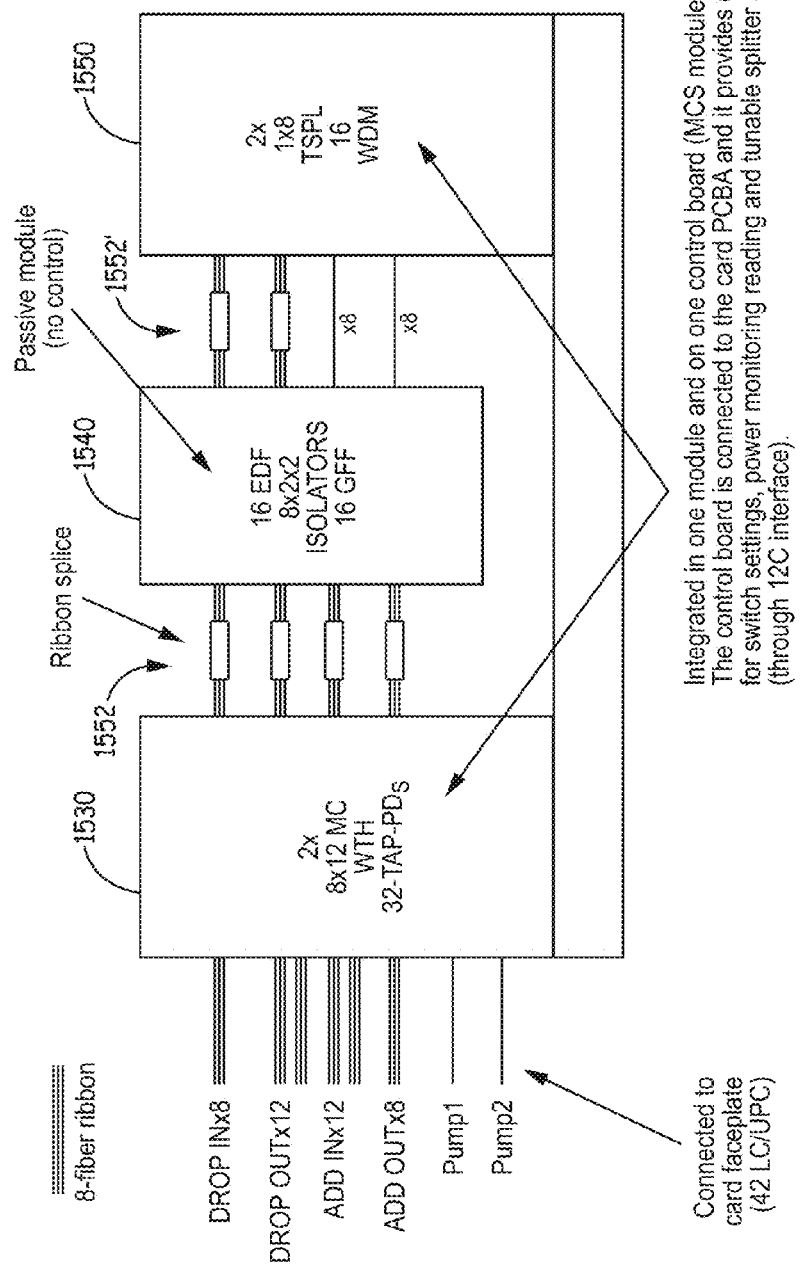
FIG. 17 is a functional diagram of connections of the modules of the switch of FIG. 15.

A conceptual arrangement of an expandable 4×3 planar lightwave circuit (PLC) cross connect is shown in FIG. 13. Expandable 4×3 PLC cross-connect 1300 has $N_i$ inputs 1302 and $N_e$ expansion inputs 1303. Switch 1300 has $M_o$ outputs 1308 and $M_e$ expansion outputs 1309. Bypass switches 1312, 1314 serve inputs 1302 and 1308, respectively. A significant feature to note is that in a compact arrangement, the length of the waveguide array supports a series of switching stages where the number of stages is M+N−1. Based on current feature sizes, switches larger than 4×4 would involve wrapping the waveguides on the PLC chip. An 8×8 PLC cross connect switch is described in Goh et al., "Low Loss and High Extinction Ratio Strictly Nonblocking 16×16 Thermooptic Matrix Switch on a 6-in Wafer Using Silica Based Planar Lightwave Circuit Technology," Journal of Lightwave Technology 19(3):371-379 (March 2001). The rough layout of a PLC as described herein that approximately follows a layout set forth in the Goh article is shown in FIG. 14. Switch 1400 has inputs 1402 and outputs 1404, with switching/interfering modules 1406 with labels #1 to #15. A set of bypass switches 1408 is provided to switch inputs 1402 and output bypasses 1410 are provided near outputs 1404. As described previously, in applying the present invention to this type of physical layout, the expansion waveguides and bypass switches of the present invention can be routed adjacent to the existing waveguides and switches, retaining the existing staging, thereby imposing little or no increase to the required size of the integrated chip.

Multicast Switch (MCS) Design

A desirable MCS switch design has been developed that can be conveniently placed on two planar lightwave circuits that interface appropriately. Also, these MCS switch designs can be made expandable through the use of optionally either 1×2 switches or 1×2 optical splitters for each Add In or Drop In line. The switched or split signals are directed to separate MCS switch systems. This provides for scalability on the output lines. Similarly, input lines can be scaled by splitting the lines for input to separate MCS switch systems, and then corresponding outputs from the different MCS switch systems can be coupled back together.

A desirable MCS design is shown in FIGS. 15-23. Scalability features are only shown on FIG. 15 for simplicity. The design on these figures, for example, shows two optical multi-cast switch functions 1502 (each consisting of an array of optical splitters 1054, and array of optical switches 1506, and interconnection 1508 between the two), 32 optical tap couplers 1510, 32 photodiodes 1512, 32 photodiodes, 32 optical isolators 1514, 16 gain flattening filters 1516, 16-erbium-doped fiber spools 1518, two 1×8 tunable splitters 1520, the interconnect between all of the above functions and the electrical control electronics. Switches/splitters 1522 (FIG. 15) may employed, with a plurality of MCS 1500 being downstream of the same. In the embodiment shown in the figures, the functions are efficiently partitioned into separate modules 1530, 1540, 1550 with fiber interconnects 1552, 1552' between them. One module 1530 comprises planar lightwave circuits (PLC) based monolithic integration of optical functions, a photodiode hybrid integration and the electrical control. The second module 1540 comprises discrete components that are arrayed in such a way that allows efficient fiber interconnection between the first module and the second module. Third module 1550 can comprise wavelength division multiplexer, e.g., an arrayed waveguide grating or the like, and tunable splitter (TSPL). FIGS. 18-23 show a depiction of various views of an embodiment of assembled modules forming the device.

Figure 23:
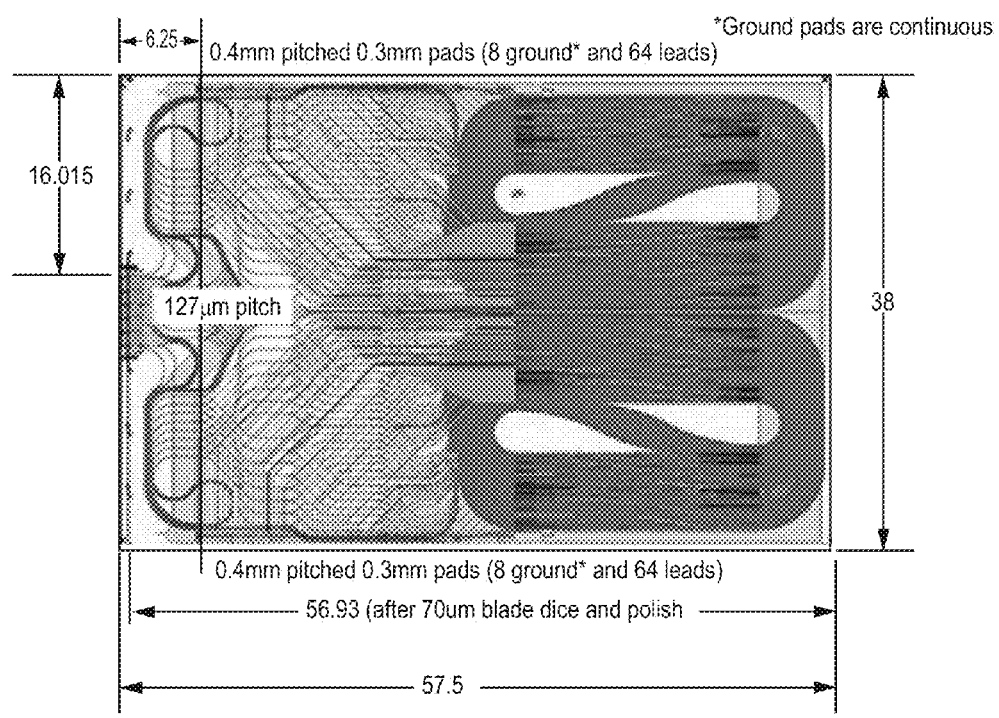
FIG. 23 is a top view of a layout for the expandable switch of the card of FIG. 18

In general, the expandable switching elements shown schematically in FIGS. 1-13 can be effectively formed using free space optical components connected with optical fibers. Suitable individual switches, optical splitters, optical fiber connectors and other incidental components are commercially available and improved versions are under continuous development. However, it can be desirable to integrate the devices as planar optical circuits on an appropriate chip. Thus, an expandable switch can be formed as an individual planar device with appropriate packaging, and suitable connectors can be used to connect multiple switches to take advantage of the expansion capability. The layout of the large number of connections on a planer chip is an art to obtain an appropriately small foot print with all of the available functionalities. An example of such a layout is shown in FIG. 23.

The materials for forming the PLC can be deposited on a substrate using CVD, variations thereof, flame hydrolysis or other appropriate deposition approach. Suitable substrates include, for example, materials with appropriate tolerance of higher processing temperatures, such as silicon, ceramics, such as silica or alumina, or the like. In some embodiments, suitable silicon dioxide precursors can be introduced, and a silica glass can be doped to provide a desired index of refraction and processing properties. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference. The parameters for formation of an appropriate waveguide array are known in the art. Similar processing can be performed using InP glass or other optical glass materials.

In general, optical signals passing through a switch can have attenuated signals. While the expansion designs herein can reduce such attenuation, it can be desirable to associate the expandable switches with appropriate optical amplifiers. Thus, it can be desirable to layer an array of optical amplifiers coupled into the inputs of the switch, although the precise structure can be designed appropriate to the system. In particular, some structures are described below in the context of a ROADM.

ROADM Architecture with Multicast Switch

A desirable colorless, directionless, contentionless, and flexible-grid ROADM architecture is based on a M×N multicast switch and a OXC load balancer. Multi-degree colorless and directionless ROADMs based on a broadcast (via 1×N optical couplers) and select (via M×1 wavelength selective switches (WSS's)) architecture in express paths have been deployed for several years [1,2]. However, with respect to local add/drop paths, so far only colored wavelengths (λ's), or a limited number of colorless λ's have been deployed. Owing to the fast traffic growth, there is a need for a multi-degree central office (CO) node to dynamically add/drop a large number of colorless, directionless, and contentionless (CDC) wavelengths [2]. As an example, consider an 8-degree CO with 96λ's from/to each of its 8 directions, a 50% add/drop ratio would require the CO to add/drop 96·8·50%=384λ's. To add/drop such a large number of λ's, modular and scalable M×N multicast switches (MCS's) are believed to offer the most economical solution today. Herein, are presented methods to optimize the architecture of an MCS-based flexible-grid CDC ROADM such that its cost is minimized. One embodiment is shown in FIGS. 18-23.

Figure 18A:
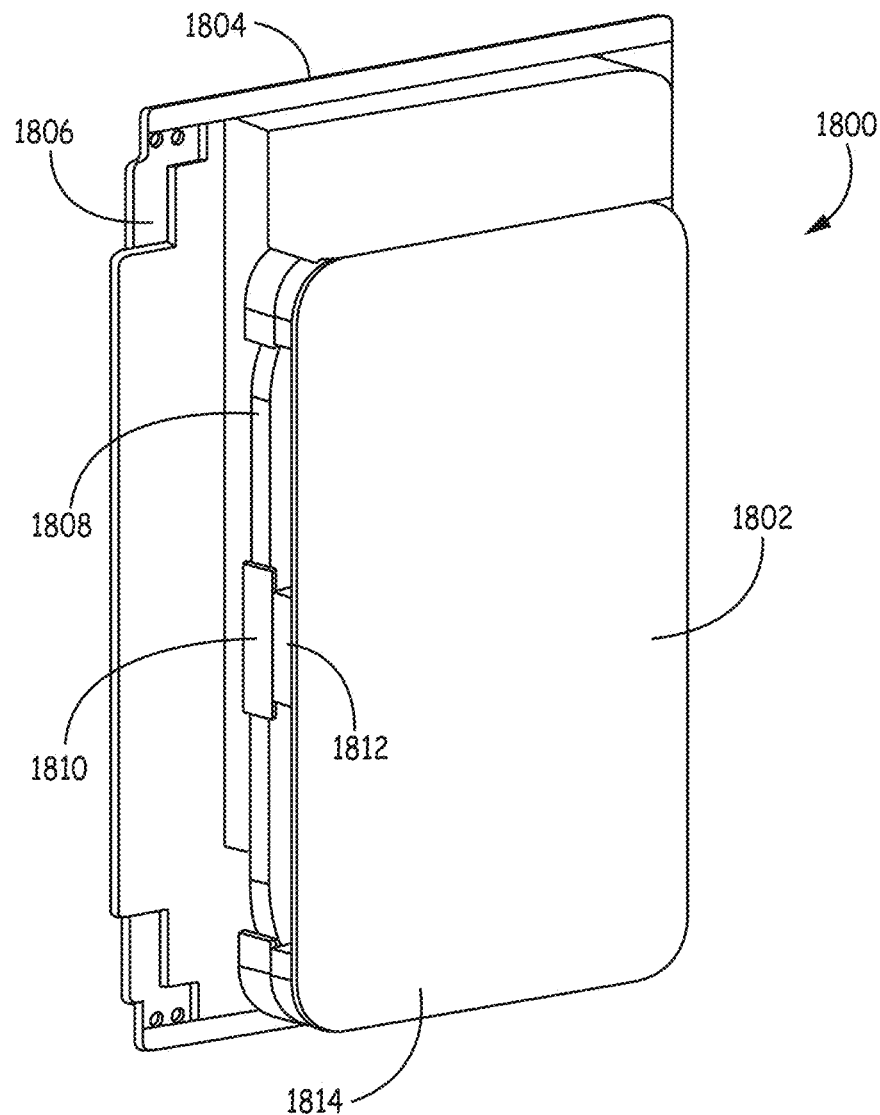
FIG. 18A is a perspective view of a model of a front side of a card.
Figure 18B:
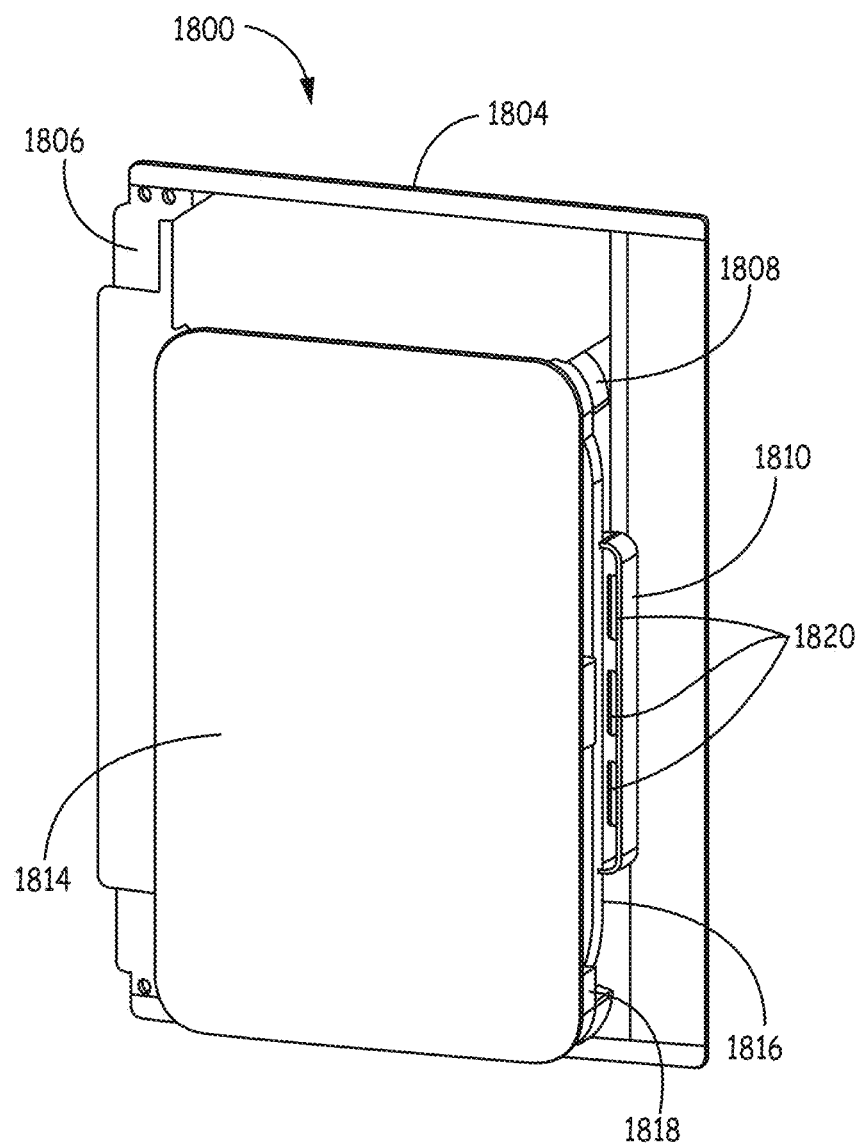
FIG. 18B is a perspective view of the back side of the card of FIG. 18.
Figure 19:
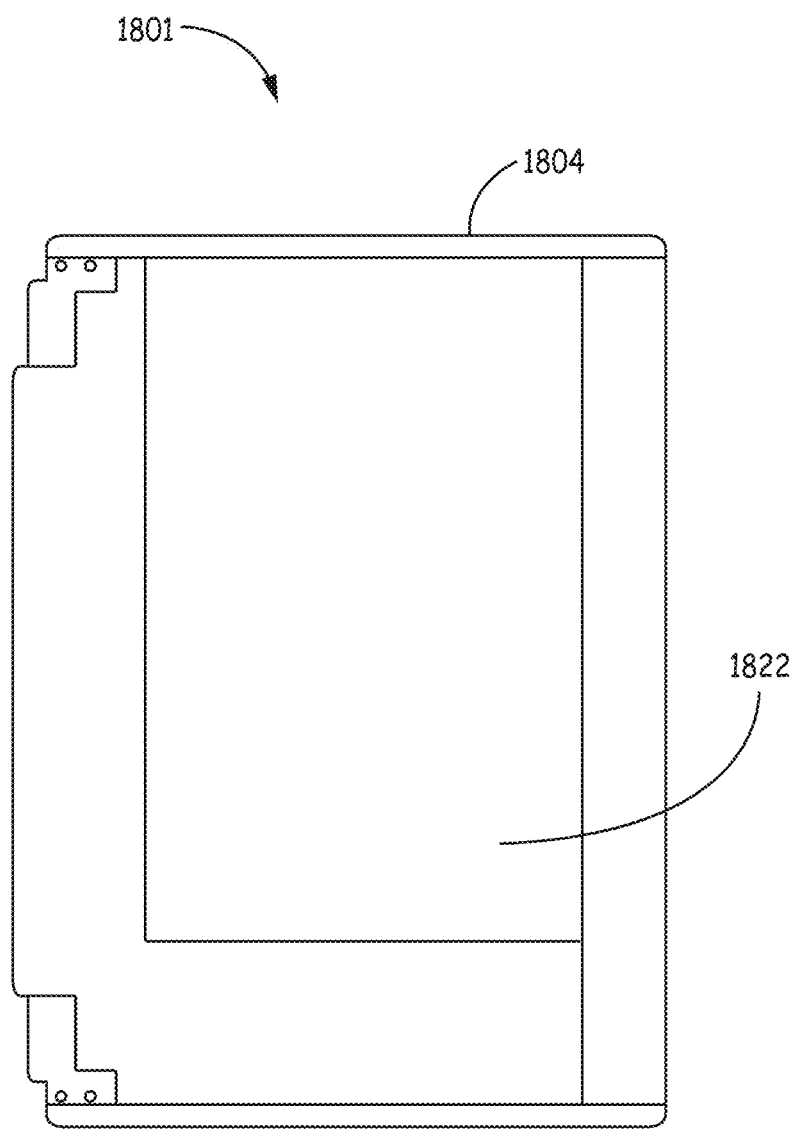
FIG. 19 is a plan view of a subassembly of the card of FIG. 18.
Figure 20:
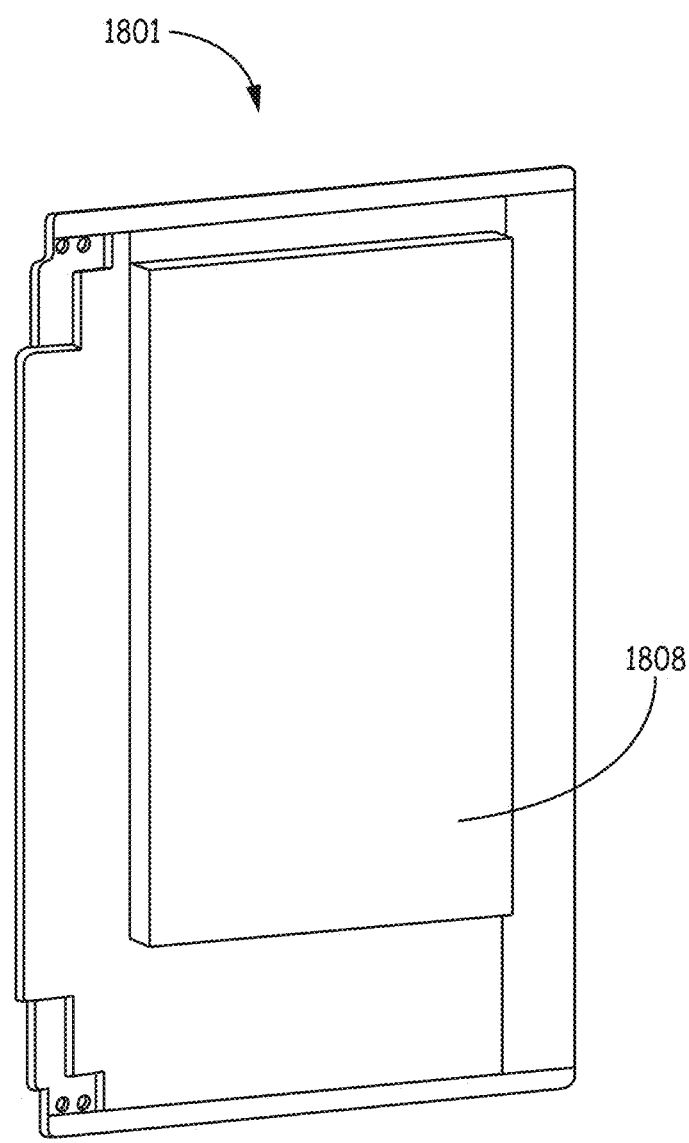
FIG. 20 is a perspective view of a subassembly of the card of FIG. 18.
Figure 21:
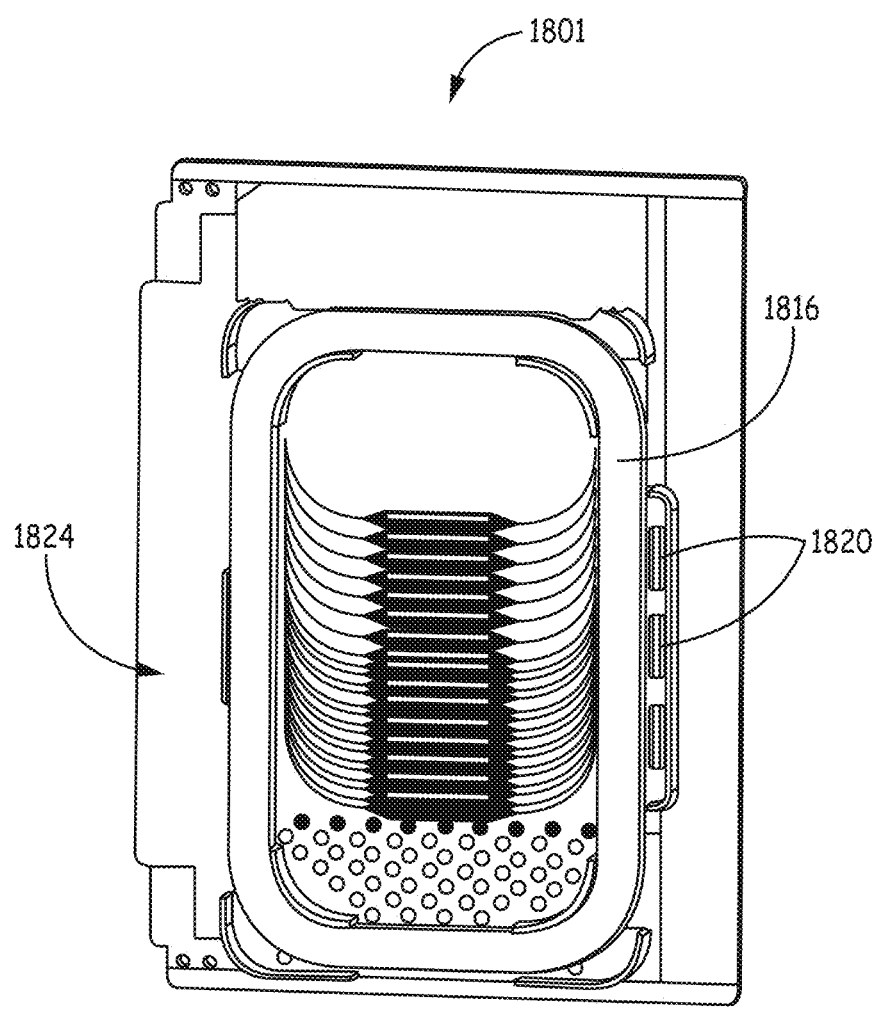
FIG. 21 is a perspective view of a subassembly of the card of FIG. 18.
Figure 22:
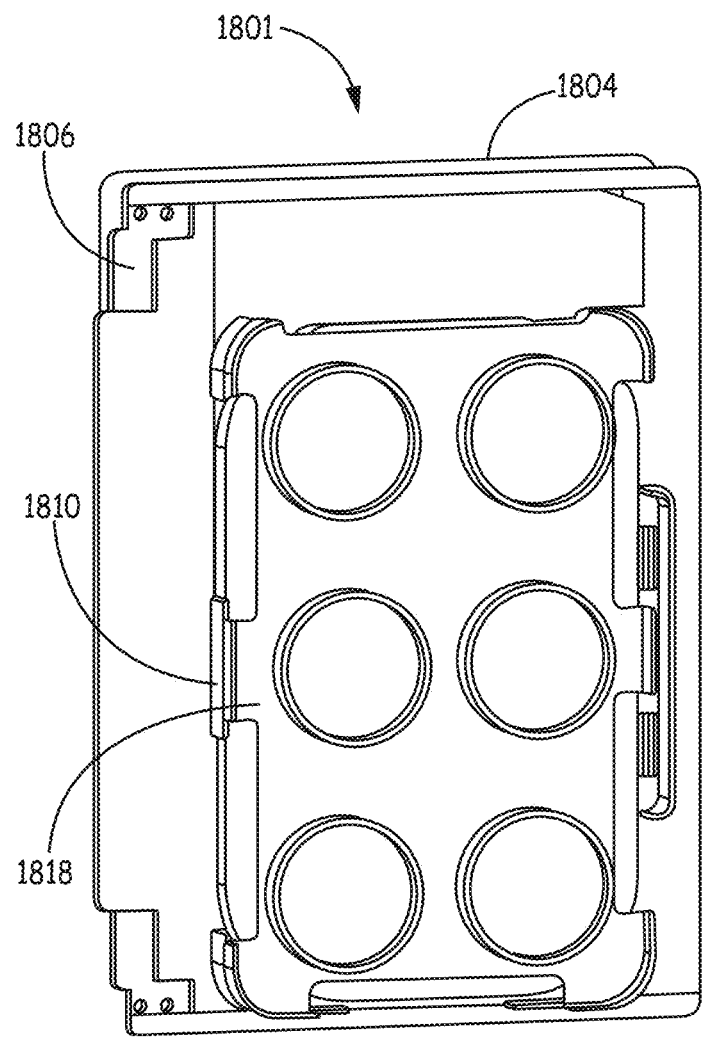
FIG. 22 is a perspective view of a subassembly of the card of FIG. 18.

FIG. 18A depicts MCS-based flexible-grid CDC ROADM card 1800 with front side 1802, heat sink 1804, line card 1806, multicast switch module 1808, isolator/EDF tray 1810, fiber management tray 1812, and cover fiber management tray 1814. FIG. 18B is another side perspective view of the card 1800 further showing fiber 1816, fiber management tray 1818, and protector fiber splicing 1820. FIG. 19 is a plan view of a subassembly 1801 of card 1800, showing keep-out area 1822. FIG. 20 is a perspective view of subassembly 1801 showing multicast switch module 1808 in place over keep-out area 1822. FIG. 21 is a plan view of subassembly 1801 with isolator/GFF/EDF tray 1824, fiber 1816, and protector fiber splicing 1820. FIG. 22 shows subassembly 1801 with fiber management tray 1818. Heat sink 1804 is placed near the top of the card. Input/output fibers come out at an angle on the bottom of the MCS/TSPL module and are routed to the face-plate bulkheads. FIG. 23 depicts a rough layout for a planar-integrated 4×16 expandable MCS, including some possible relative dimensions and other rough details, although specific layouts generally involve specific preferences of a designer.

Basic CDC ROADM Architecture Based on M×N Multicast Switches

Figure 24A:
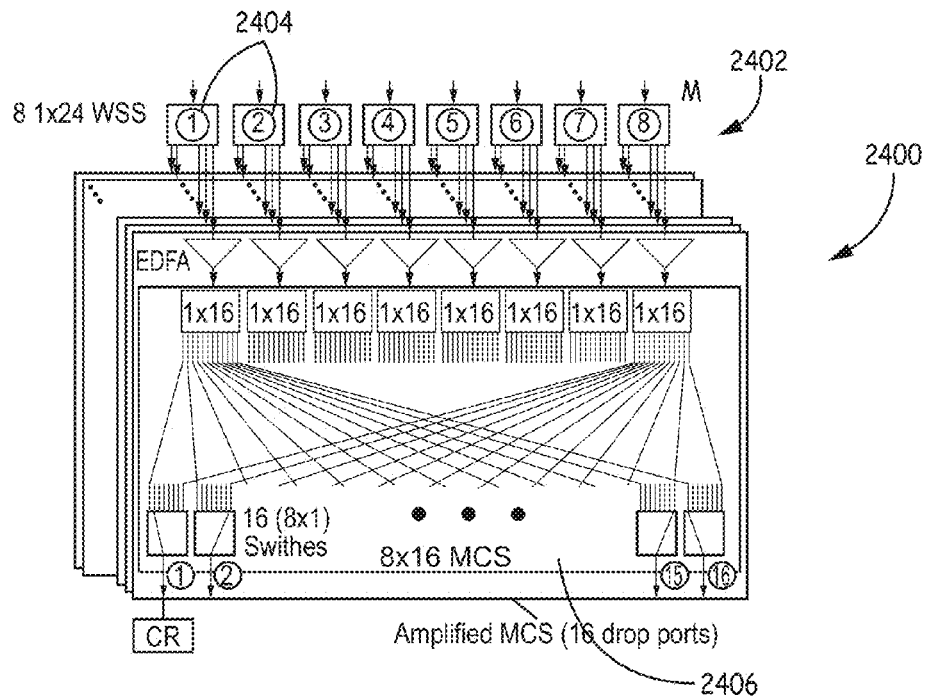
FIG. 24a is an embodiment of a multicast switch.

A basic M×N MCS 2400 is shown in the gray card of FIG. 24a, with M=8 and N=16, as an example. Each of 8 MCS input ports 2402 is connected to one of the eight directions. An MCS provides "colorless" drop without pre-filtering to an external coherent receiver (CR), which has a built-in tunable laser serving as a local oscillator, or alternatively an external tunable channel filter can isolate a single wavelength channel to be provided to a standard direct-detection receiver. A tunable channel filter could increase the overall cost significantly unless an extremely low cost technology can be developed, and therefore our focus will be on coherent systems only. An MCS is "directionless" because any output port can drop any input signals from any direction via a 1×M selection switch. An MCS is also "contentionless" because each 1×M switch can only select signals from a particular direction, so for the defined operation precludes λ's of the same color from different directions from colliding with each other. Finally, an MCS also has the feature of "flexible grid" due to the filter-less feature of a CR, which also makes MCS-based ROADM inherently low cost.

A standalone MCS cannot complete the multi-degree CDC add/drop functions owing to a few reasons. First of all, the loss of 1×N splitters may be compensated by erbium-doped fiber amplifiers (EDFAs). Secondly, due to the limited output ports per MCS (N≤24 using today's planar-lightwave-circuit or MEMS technology), multiple MCS cards must be added in a pay-as-you-grow manner. For a total of 384λ's, 384/16=24 8×16 MCS cards need to be used. As a result, between each drop fiber and 24 MCS cards, a 1×24 WSS can be used to split the incoming 96λ's from each direction into its 24 output ports, and most importantly, to control the maximum number of λ's per output port ($N_{WSS,max}$). A basic CDC ROADM architecture may have a top layer of 8 1×24 WSS's, a second layer of 192 EDFAs, and a bottom layer of 24 8×16 MCS cards, to enable 384λ's dropped from any of the 8 directions without contention. Hot-standby protection can be achieved by adding an extra amplified MCS card to FIG. 24a, so that in the event that any of the active amplified MCS cards fail, the top-layer WSS's can re-route the corresponding traffic to the protection card. A similar architecture is needed for the add direction. Note that in this basic architecture, the large number of EDFAs and the large port-count WSS could cause cost, space, and power consumption issues.

The parameter $N_{WSS,max}$ mentioned above must meet the following conditions: (i) $N_{WSS,max} \leq N_{CR}$, where $N_{CR}$ is the maximum number of coincident λ's that can be handled by a CR with acceptably low OSNR penalty [4]—this condition is required because all $N_{WSS,max}$ λ's would be received by a CR. (ii) $N_{WSS,max}=N_{split}$, where $N_{split}$ is the total number of post-EDFA split ports ($N_{split}$=16 in FIG. 24a)—this condition is required to cope with the worst non-uniform traffic when λ's arrive into an amplified MCS from only one direction, and each CR selects a unique wavelength. If $N_{WSS,max}>N_{split}$ implies ($N_{WSS,max}-N_{split}$) λ's have no output port to exit, while $N_{WSS,max}<N_{split}$ implies when the incoming λ's continue to flow in from only one direction, one has to add new amplified MCS cards even when there are still empty ports left in the original card. Therefore, the ideal condition is $N_{WSS,max}=N_{split}$. (iii) Each EDFAs should provide $N_{WSS,max}$ λ's with sufficient optical power per λ ($P_{rec}$) at a CR, which has a typical receiver sensitivity of −20 dBm for 100 G DP-QPSK. Combining conditions (i) and (ii), the expression may be made that:

$$N_{split}=N_{WSS,max} \leq N_{CR}, \text{ for all EDFAs in an amplified MCS card} \quad (1)$$

Figure 24B:
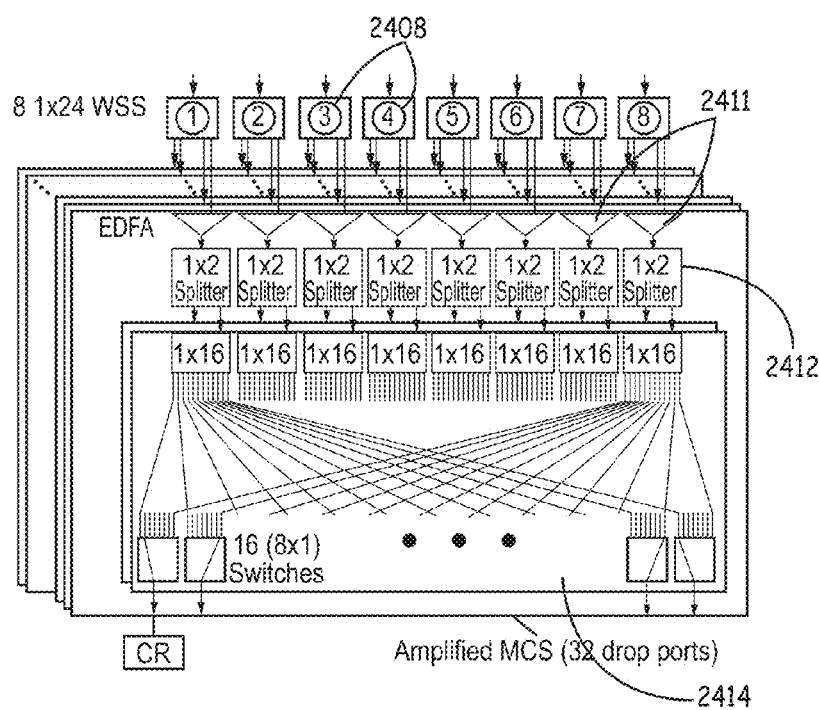
FIG. 24b is an alternative embodiment of a multicast switch.

From condition (iii), therefore:

$$P_{rec}=P_{EDFA}-10 \cdot \log(N_{WSS,max})-10 \cdot \log(N_{split})-IL_{excess} \quad (2)$$

where $P_{EDFA}$ is the total output power of each EDFA, and $IL_{excess}$ is the MCS excess loss over 10·log(N), which could range from 3 to 6 dB. Eqs (1) and (2) imply that every EDFA in FIG. 24 is designed to handle the worst-case non-uniform traffic, i.e., $N_{WSS,max}$ channels of λ's, and consequently requiring higher power EDFAs and higher cost. The effect of non-uniform traffic can be expressed in terms of non-uniform to uniform traffic ratio η. For example, in FIG. 19a, a uniform traffic with 50% drop ratio gives us $N_{WSS,unif}$= 96·50%/24=2, and therefore η=$N_{WSS,max}/N_{WSS,unif}$=16/2=8.

CDC ROADM Architecture Based on M×N Multicast Switches

FIG. 24 shows an 8-deg, 50% drop CDC ROADM: FIG. 24a using 8 1×24 WSS's 2404 and 24 amplified 8×16 MCS's 2406; (b) using 8 1×12 WSS's 2408 and 12 amplified dual-8×16 cards by inserting a 1×2 splitters 2412 between EDFAs 2411 and dual-MCS's 2414. Block labeled CR=depicts a coherent receiver. Further improvement of the basic architecture in FIG. 24a for cost and size reduction is described as follows. From a cost standpoint, per add/drop port cost in a CDC ROADM is given as $$\text{Per add/drop port cost=Per MCS add/drop port cost+ EDFA cost}/J+\text{WSS port cost}/K \quad (3)$$

Figure 25:
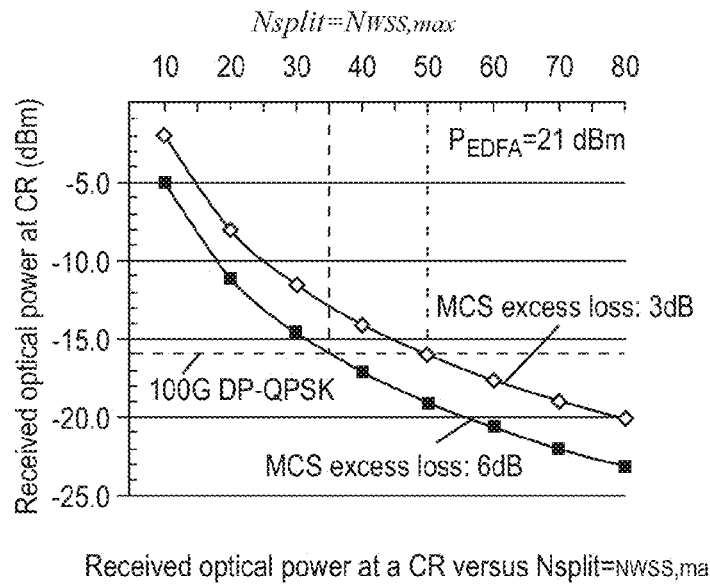
FIG. 25 is a graph of received optical power at a CR.

In the example shown in FIG. 24a, J=2 (every 8 EDFAs correspond to 16 MCS add/drop ports) and K=2 (every 8 WSS add/drop ports correspond to 16 MCS add/drop ports). The question now is whether J and K can be further increased by increasing $N_{split}$, so that more MCS add/drop ports can share the higher layer EDFA and WSS cost. One approach is to increase the add/drop port count of an MCS, but the maximum port count per MCS is ≤24 today. Another approach is to insert $1 \times 2^L$ (L=1, 2, 3, . . . ) splitters between EDFAs and MCSs (so that $N_{split}=N \times 2^L$), as shown in FIG. 1b (L=1). Note that the addition of a 1×2 splitter layer in FIG. 24b effectively makes the amplified MCS an 8×32 module, which enables the reduction of the number of amplified MCS cards and WSS ports by 50%, as can be observed by comparing FIGS. 24a and 24b. On the other hand, $N_{split}$ cannot be too large—its upper bound can be obtained from Eq. (2) by letting $N_{split}=N_{WSS,max}$ and $P_{EDFA}=21$ dBm, and the result is shown in FIG. 25. Assuming $P_{rec}=-16$ dBm (this gives a 4 dB margin for a typical CR), we see that $N_{split}$ can be ≤32 (e.g., using dual-8×16 MCS's with 1×2 splitters) or ≤48 (e.g., using dual-8×24 MCS's with 1×2 splitters), depending on the MCS excess loss.

Figure 26:
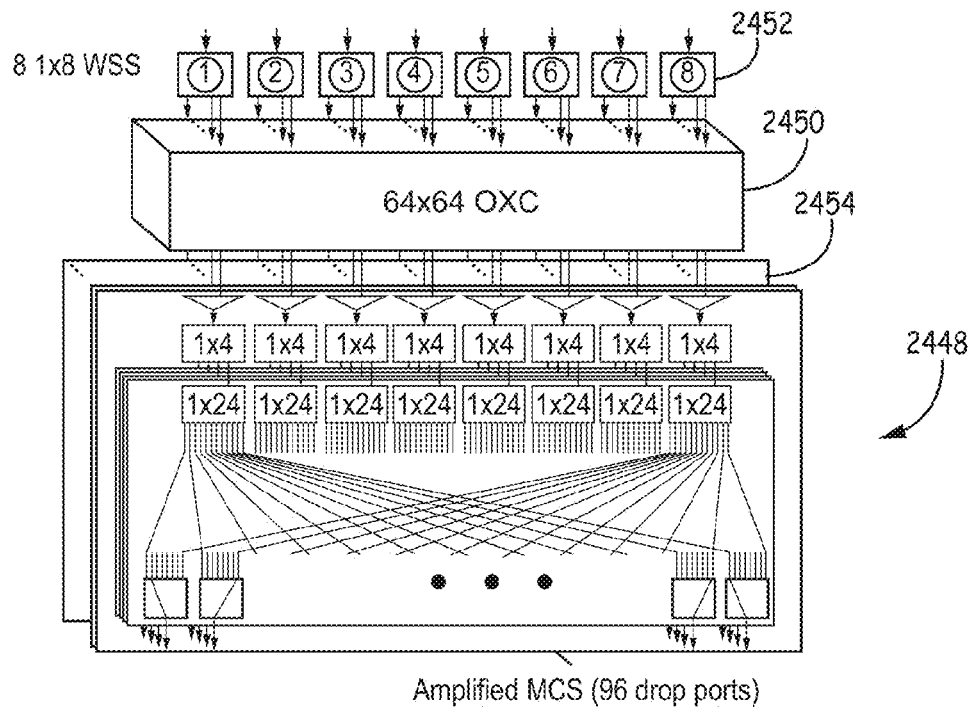
FIG. 26 is an embodiment of a multicast ROADM with a crossover switch load balancer.
Figure 27:
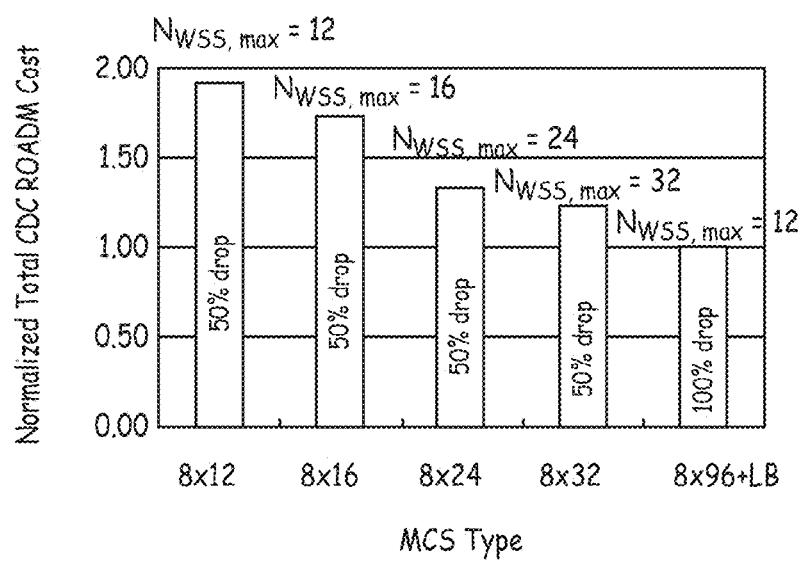
FIG. 27 is a bar graph of a ROADM cost using different multicast switch types and drop ratios.

A typical $N_{CR}$≤12~16 today, and therefore $N_{CR}$ in Eq. (1) actually sets a more severe constraint on $N_{split}$ than Eq. (2)—even though this constraint may be relaxed via future proprietary digital signal processing algorithms. Eq. (1) also indicates that $N_{split}$ and $N_{WSS,max}$ are tightly coupled such that every time $N_{split}$ doubles, $P_{rec}$ is reduced by 6 dB rather than 3 dB. There are, however, a few architectural approaches to relax the constraints on $N_{split}$ set by Eq. (1). The first is to use a tunable filter array (TFA) between MCS's and CR's to ensure the number of received λ's at a CR is ≤$N_{CR}$ even though $N_{split}=N_{WSS,max}$ is large [5]. The disadvantage of this approach is that the cost of TFA adds directly to the per drop port cost, and the TFA's ~2 dB insertion loss could effectively increase the EDFA cost. The second approach is to let the EDFAs in an amplified MCS card share one or two pump lasers via a tunable 1×M splitter, so that the majority of the EDFAs do not need to amplify a full load of $N_{WSS,max}$λ's, thus saving cost [3]. The disadvantage of this method is that it is difficult to adjust the pump sharing among EDFAs flexibly for dynamic λ, add/drop. Also, this method does not allow a large $N_{split}$ to increase K in Eq. (3). Our approach is to decouple $N_{split}$ from $N_{WSS,max}$ in Eq. (1) so $N_{split}$ can be independently increased. As shown in FIG. 26, that depicts an MCS-based CDC ROADM with an OXC load balancer (100% drop) 2448, an N×N (N=64) optical cross-connect (OXC) 2450 is inserted between WSS 2452 and EDFA 2452 layers, and $N_{split}$ is dramatically increased to 4×24=96. The OXC serves as a "load balancer" (LB), i.e., even when the first 96λ's are arriving from only one direction (say direction West), the load balancer will re-shuffle the 8 West WSS output ports (with 12λ's per port) to the front row so that only one, instead of multiple, amplified MCS card needs to be used. The ROADM in FIG. 26 has the following features: (a) it allows 100% add/drop so that its cost can be shared by up to 784 add/drop ports; (b) it exhibits an excellent η of unity; (c) it uses a low number of coincident channels at a CR ($N_{WSS,max}=12$) and its insertion loss of ~2 dB can be easily compensated by the following EDFAs without increased cost; (d) it increases the post-EDFA split significantly to 96, but still operates at a reasonable $P_{rec}=-15$ dBm (obtained from Eq. (2) with $P_{EDFA}=21$ dBm and $IL_{excess}=5$ dB). Also, J and K in Eq. (1) are now increased to 12, which results in the lowest overall material cost, as shown in FIG. 4 (see "8×96+LB"). Also shown in FIG. 27 is the relative cost of other types of MCS using the conventional approaches (i.e., FIG. 24) with 50% add/drop. The main reason that a load-balancer can reduce the total cost of an 8×16 MCS-based ROADM by ~70%, for example, is because in the drop direction 192 15 dBm EDFAs is reduced to 64 21 dBm EDFAs, and the number of WSS ports is reduced from 192 to 64. For a fair comparison in FIG. 27, 8×12 and 8×16 MCS's cannot quite achieve 50% add/drop because 1×32 and 1×24 WSS are not available today, while 8×24 and 8×32 MCS's could encounter certain OSNR penalties due to the fact that its $N_{WSS,max}$ exceeds today's $N_{CR}$ of 12~16.

Figure 28:
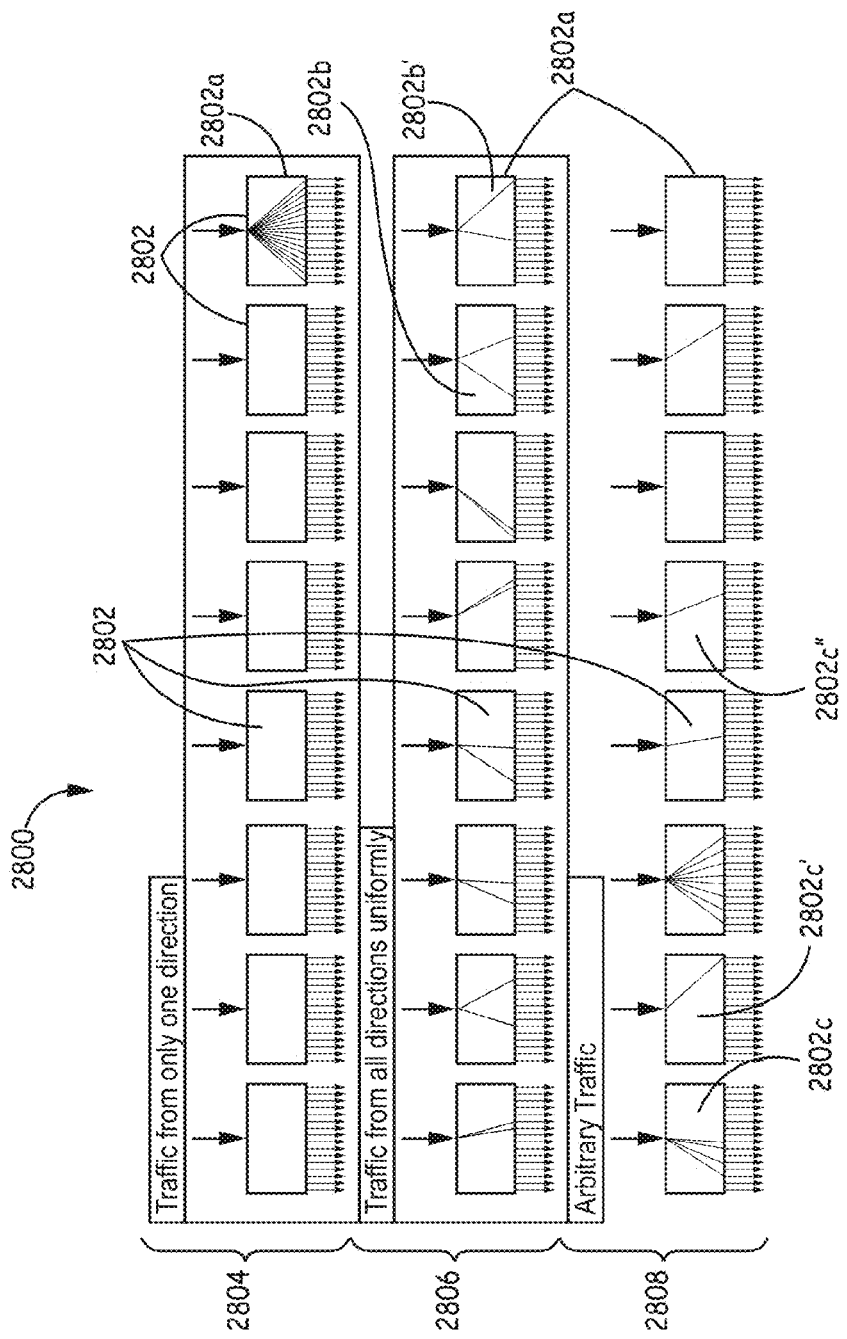
FIG. 28 depicts an improved architecture for a ROADM using 8 programmable splitters.

FIG. 28 depicts the ROADM integrated into various network configurations. The use of the expandable multicast switches provide desirable routing flexibility. ROADM 2800 has programmable splitters 2802 that are programmable to avoid distributing optical power into dormant channels and the associated waste. The programmable splitters 2802 can dynamically reconfigure power distribution for, e.g., single direction traffic 2804, with 2802a depicting a splitting effect. Splitters 2802 are programmable for, e.g., traffic from all directions uniformly, 2806, with 2802b, 2802b' depicting exemplary signal flow. Splitters 2802 are programmable for arbitrary traffic, 2808, with 2802c, 2802c', 2802c" depicting the same.

Figure 29:
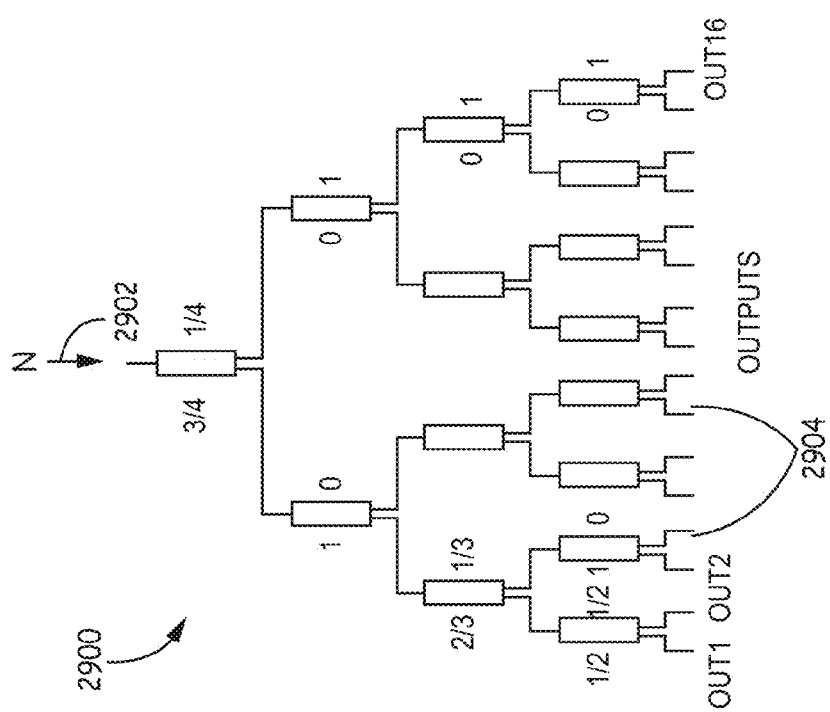
FIG. 29 depicts an MZI-based programmable splitter and exemplary specifications.

FIG. 29 depicts an embodiment of a continuous switch used as a programmable splitter. MZI-based programmable splitter 2900 has an input N, 2902, dynamically split among 16 outputs 2804. Such a splitter can be used as a splitter tree for a multicast switch, such as for the specific embodiments described above. In general, a continuous-range optical switch can be made i.e. from Mach-Zehnder interferometer accepting a continuous range of drive voltages to its phase shifter. Optical switches for the architectures described herein, such as 1×2, 2×1 and 2×2 switches, can similarly be based on Mach-Zehnder Interferometer structures. Alternative optical switch designs can be based on MEMs technology and/or other mechanical structures, e.g. piezoelectric based structures, electro-optical effects, magneto-optical effects, combinations thereof of the like. In general, optical switch designs are known in the art and are under continual further development.

Figure 30:
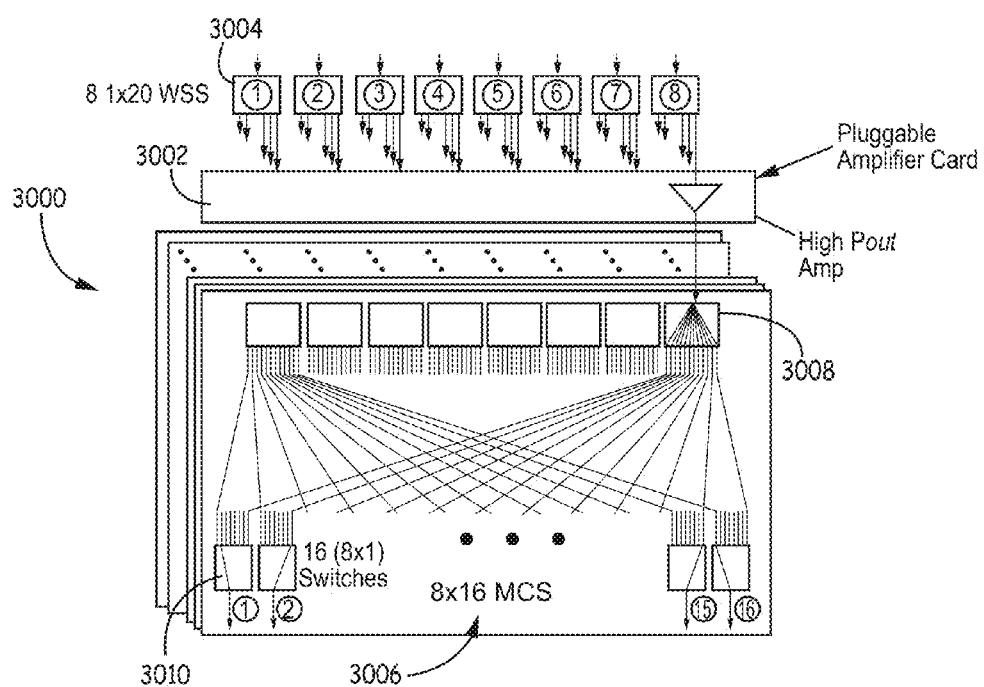
FIG. 30 depicts an MCS with for the case wherein initial traffic flow is from only one direction.
Figure 31:
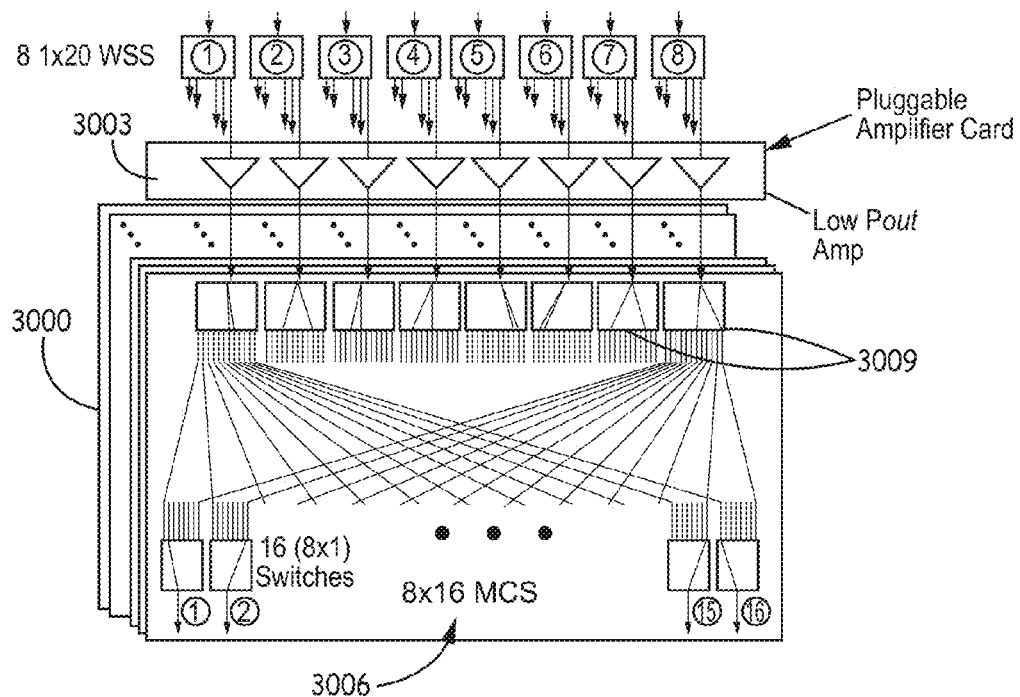
FIG. 31 depicts an MCS with for the case wherein initial traffic flow is uniformly from all directions.

FIG. 30 depicts an alternative embodiment of the ROADM design of FIG. 24a. In this embodiment, ROADM 3000 comprises a pluggable amplifier card 3002 placed between the wavelength selective switches (WSS) 3004 and the MCS circuits 3006. MCS circuits 3006 comprise splitters 3008 and switch banks 3010. The amplifiers can amplify each input signal into the MCS. FIG. 31 depicts a variation on the embodiment with low power amplifiers for use with networks with traffic from all directions uniformly, referring to FIG. 28.

Figure 32:
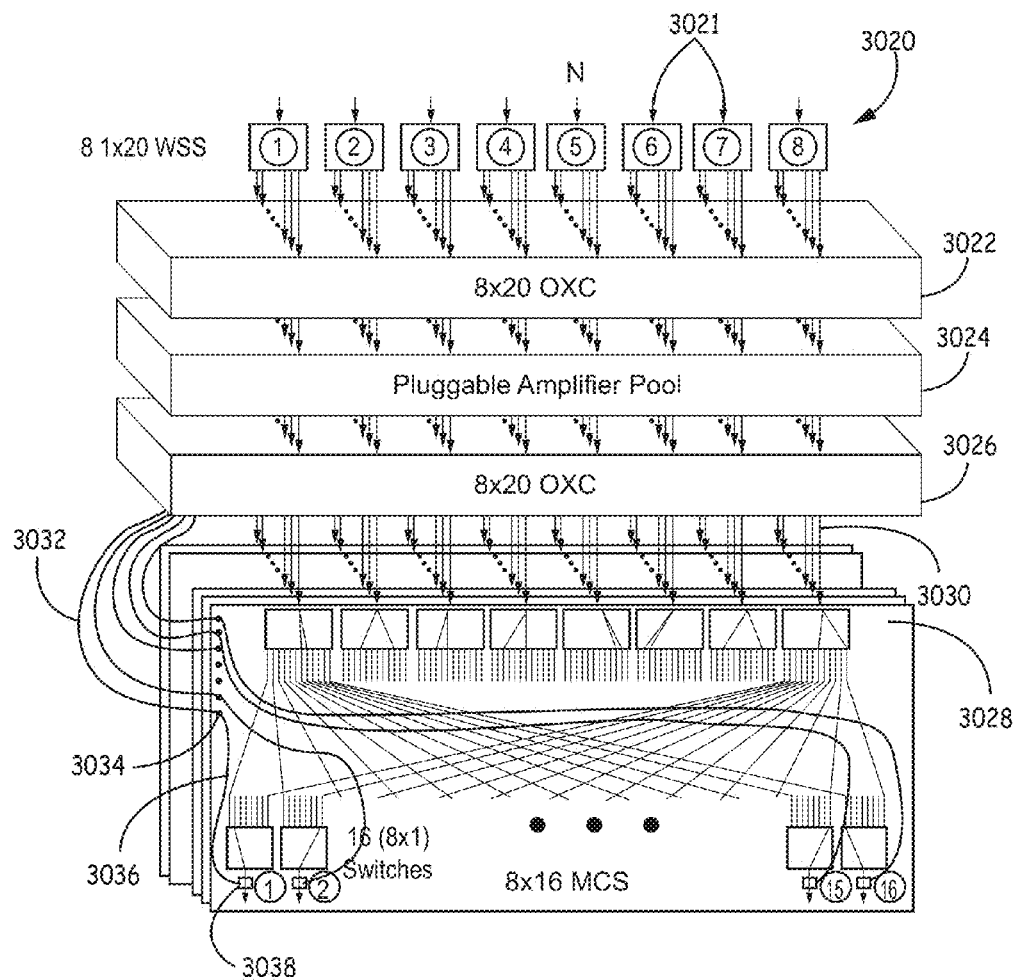
FIG. 32 depicts an MCS with for the case wherein fully automatic flexibility is provided.

FIG. 32 depicts an embodiment of a ROADM with a set of 8 1×20 WSS 3020 connected to inputs 3021 providing input into OXC cross connect switches 3022 for load balance. A pluggable amplifier pool 3024 provides amplification of the signals form the WSS. In some embodiments, a portion of the output 3030 from the OXC 3020 can be directed to input ports of MCS 3028, and a second portion of the outputs 3032 of the OXC can be directed to expansion-in ports 3034 of the MCS, which are connected to bypass light paths 3036 leading to bypass switches 3038. This embodiment includes providing fully automatic and flexible switching.

Figure 33:
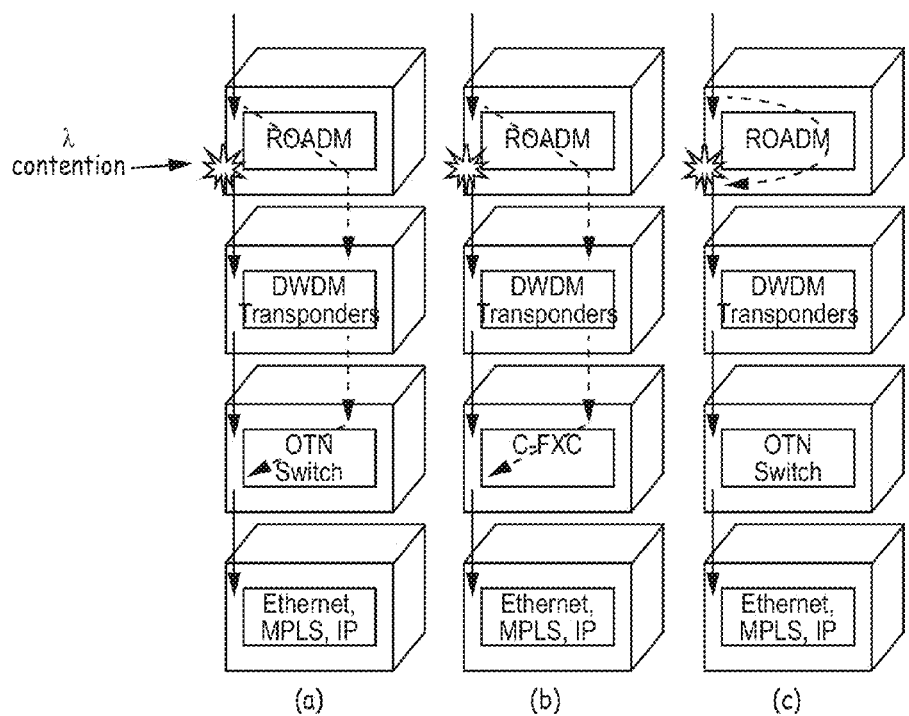
FIG. 33 is a schematic of various hardware contention mitigation options.

A ROADM design using alternative routes within the ROADM is depicted in FIG. 33. The architecture of panel (c) is contrasted with a ROADM with contention mitigation based on pre-installed large number of DWDM transponders and optical transport network switch ports is depicted schematically in panel (a) and based on client side fiber cross connects of panel (b). While the expandable switches described herein can be effectively used in any of these architectures, the design in panel (c) involves rerouting through contention reduction banks of switches to mitigate contention down to probabilities of little consequence. The architecture of an embodiment of the ROADM is shown in FIG. 34.

Figure 34:
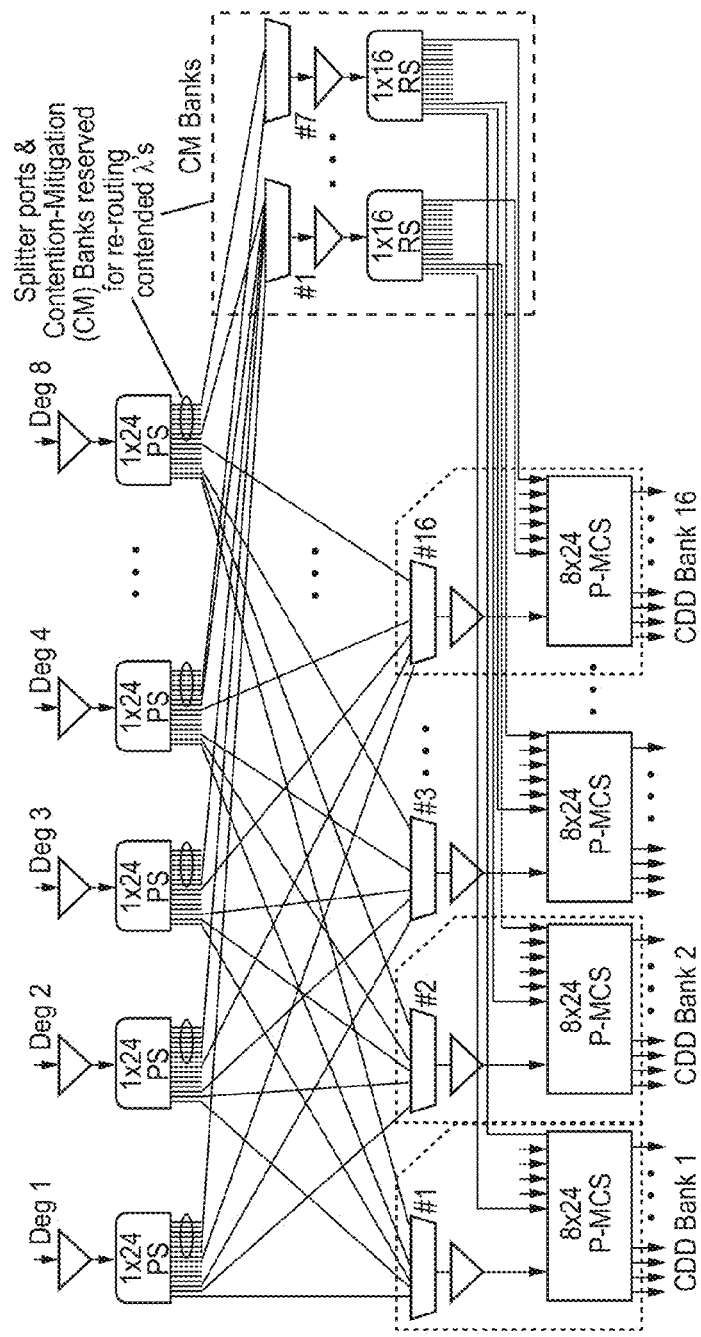
FIG. 34 is a schematic of CD architecture with contention migration.

As shown in FIG. 34, contention reduction banks can comprise up to N−1 contention mitigation (CM) switch structures, in which N is the number of inputs into the ROADM. Each CM switch structure can comprise N×M switches, such as cross connect switches or other similar switch functions. As shown in FIG. 34, each switch structure comprises 1×8 power couplers and a 1×16 power switch, that provide cross connect functionality. The ROADM further comprises M drop banks. As shown in FIG. 34, output from the WSS go to M (1×N) power couplers that provide input into MCS switches, and output from the contention banks are also directed to MCS inputs. In alternative embodiments based on the expandable MCS switch designs described herein, outputs from the contention banks can be directed to expansion-in ports of the MCS switches and the outputs of the WSS can be directly directed to the inputs of the MCS switches without using the couplers. The blocking rate as a function of offered load can be effectively no contention, e.g., much less than $10^{-7}$ blocking rate with a larger number of contention banks, specifically, 5-7 contention banks.

Figure 35:
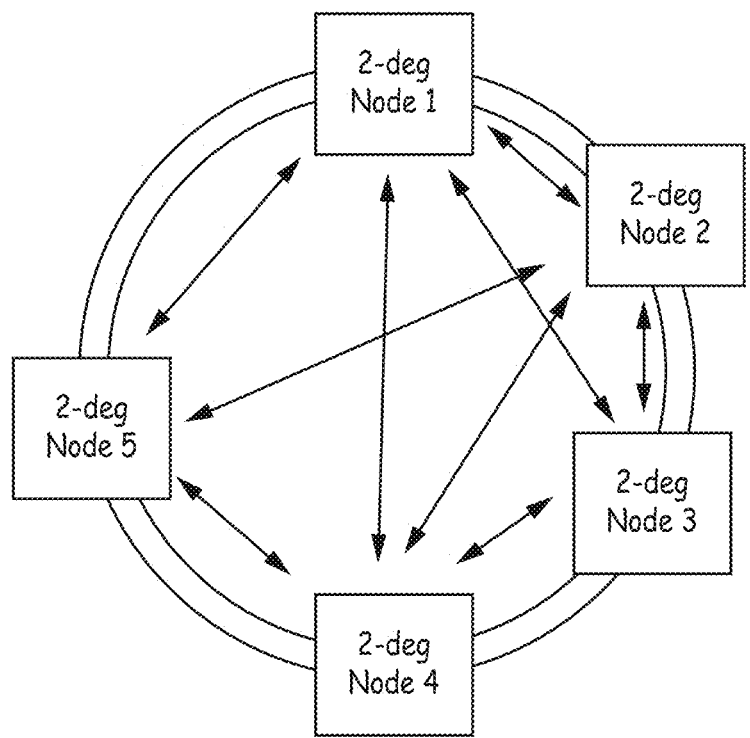
FIG. 35 is a conceptual diagram of a ring network with parallel optical paths connecting a set of nodes.

Ring optical networks can provide for considerable robustness since if a break in a line occurs, signal transmission can take place alternatively through a parallel ring regardless of the location of a break. A conceptual diagram of a ring networks with two parallel optical paths connecting a set of nodes is shown in FIG. 35. Such a ring network can be used, for example as a network metro edge with roughly 4-8 ports per node, 88 DWDM wavelengths, with colorless ROADM. In some embodiments, the ring network can be used as a centralized ring network with a main node and associated subnodes. Potential node structure is shown in FIG. 36.

Figure 36:
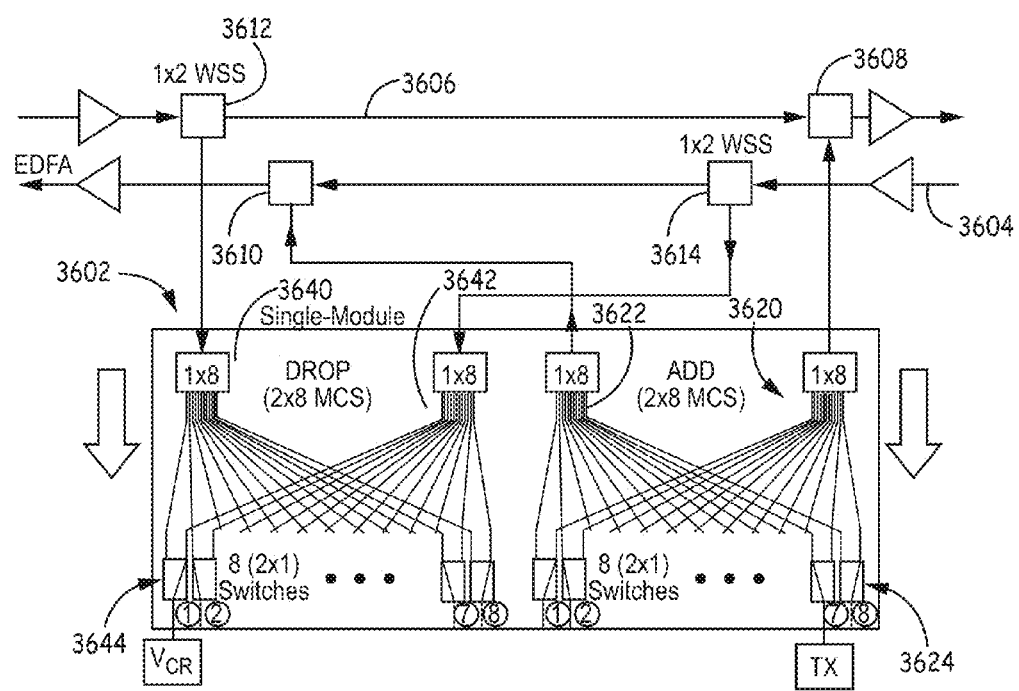
FIG. 36 depicts an example of a node structure.

Referring to FIG. 36, a node 3602 comprises two parallel structures for performing ADD and DROP functions. Each parallel optical line 3604 and 3606 connects with a 1×2 WSS to the ADD (3608, 3610) and to the DROP (3612, 3614) sides of the node. The ADD side of the node comprises two MCS 3620, 3622 connected to WSS 3608, 3610, respectively, and MCS 3620, 3622 connect at a set of 2×1 bypass switches 2624. Similarly, the DROP side of the node comprises two MCS 3640, 3642 connected to WSS 3612, 3614, respectively, and MCS 3640, 3642 connect at a set of 2×1 bypass switches 2644. If an integrated expandable MCS is used, the output from one of the pairs of MCS (3620+3622 or 3640+3642) can be directed to expansion in ports of the other MCS switch to make use of the bypass switches of the expandable switch to provide desired functionality.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

References incorporated herein by reference: [1] M. Feuer, et al., Optical Fiber Telecommunications, Vol.B, Systems and Networks, Chapter 8, 2008; [2] S. Gringeri, et al., IEEE Commn. Mag., p. 40, July 2010; [3] S. Zhong and J. Bao, US patent application publication, US 2009/0067845; [4] L. Nelson, et al., J. Lightwave Technol., p. 2933, 2010.; [5] T. Watanabe, et al., OFC/NFOEC, paper OTuD3, 2011.

What is claimed is:

1. An optical network switching node comprising N input light-paths, a drop bank and a contention mitigation structure, wherein the drop bank comprises a multicast switch (MCS) with input lines and output lines and the contention mitigation structure comprises a selective optical switch with the output from the selective optical switch directed through light channels to inputs of the MCS, wherein the N input light paths are divided into a subset providing input to the contention mitigation structure and a further subset providing input to the drop bank.

2. The optical network switching node of claim 1 wherein the MCS comprises output light-paths, expansion-in ports, bypass light-paths connected to the expansion-in ports and bypass switches optically connected to the bypass light paths and the output light paths to selective send an optical signal to a output light path and wherein the selective optical switch comprises output light paths optically connected to the expansion-in ports of the MCS.

3. The optical network switching node of claim 1 wherein the selective optical switch comprises expansion-out ports optically coupled to input ports of the MCS.

4. The optical network switching node of claim 1 wherein the contention mitigation structure comprises a wavelength selective switch (WSS), an optical amplifier configured to amplify output from the WSS and optical splitters connecting the optical amplifiers and the MCS switches.

5. The optical network switching node of claim 1 wherein the MCS switches comprise 1×L optical splitters and K×1 switches.

6. The optical network switching node of claim 1 comprising a plurality of contention mitigation banks.

7. A method for performing optical network switching comprising directing light through an optical network switching node of claim 1 with light either:
   directed into the node through the input lines and output from the node through the MCS output lines, or
   alternatively directed into the node through the MCS output lines and output from the node through the input lines.

* * * * *